US011893984B1

(12) United States Patent
Adams et al.

(10) Patent No.: US 11,893,984 B1
(45) Date of Patent: Feb. 6, 2024

(54) SPEECH PROCESSING SYSTEM

(71) Applicant: Amazon Technologies, Inc., Seattle, WA (US)

(72) Inventors: Zoe Adams, Orange County, CA (US); Robert Monell Kilgore, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 254 days.

(21) Appl. No.: 16/907,829

(22) Filed: Jun. 22, 2020

(51) Int. Cl.
G10L 15/22 (2006.01)
G10L 15/08 (2006.01)
G10L 15/26 (2006.01)

(52) U.S. Cl.
CPC .............. *G10L 15/22* (2013.01); *G10L 15/08* (2013.01); *G10L 15/26* (2013.01); *G10L 2015/088* (2013.01); *G10L 2015/223* (2013.01); *G10L 2015/227* (2013.01)

(58) Field of Classification Search
None
See application file for complete search history.

(56) References Cited

U.S. PATENT DOCUMENTS

| 2014/0310002 | A1* | 10/2014 | Nitz | G10L 15/22 704/270.1 |
| 2018/0040324 | A1* | 2/2018 | Wilberding | G10L 15/30 |
| 2018/0096283 | A1* | 4/2018 | Wang | G06Q 10/063112 |
| 2018/0190274 | A1* | 7/2018 | Kirazci | G10L 15/22 |
| 2018/0210703 | A1* | 7/2018 | Meyers | G10L 15/32 |
| 2018/0301147 | A1* | 10/2018 | Kim | G10L 15/02 |
| 2019/0196779 | A1* | 6/2019 | Declerck | G10L 15/08 |
| 2019/0327331 | A1* | 10/2019 | Natarajan | G06F 16/9038 |
| 2021/0370950 | A1* | 12/2021 | Ghosh | B60W 50/085 |
| 2022/0189471 | A1* | 6/2022 | Sharifi | G10L 15/08 |

* cited by examiner

Primary Examiner — Seong-Ah A Shin
(74) Attorney, Agent, or Firm — Pierce Atwood LLP

(57) ABSTRACT

This disclosure proposes systems and methods for speech processing and sharing permitted entity information across speech processing systems. A first system can receive first audio data representing a first utterance. The first system can receive a first dialog identifier associated with a previous utterance. The first system can determine that the first audio data references a first entity. In some cases, the first system may not be able to resolve the first entity based on information in the first audio data. The first system can send, to a second system different from the first system, a first request for information about the first entity. The first request includes the first dialog identifier. The first system can receive first data responsive to the first request from the second system. The first system can process the first data and the first audio data to determine second data responsive to the first utterance, and output a first response representing the second data.

18 Claims, 15 Drawing Sheets

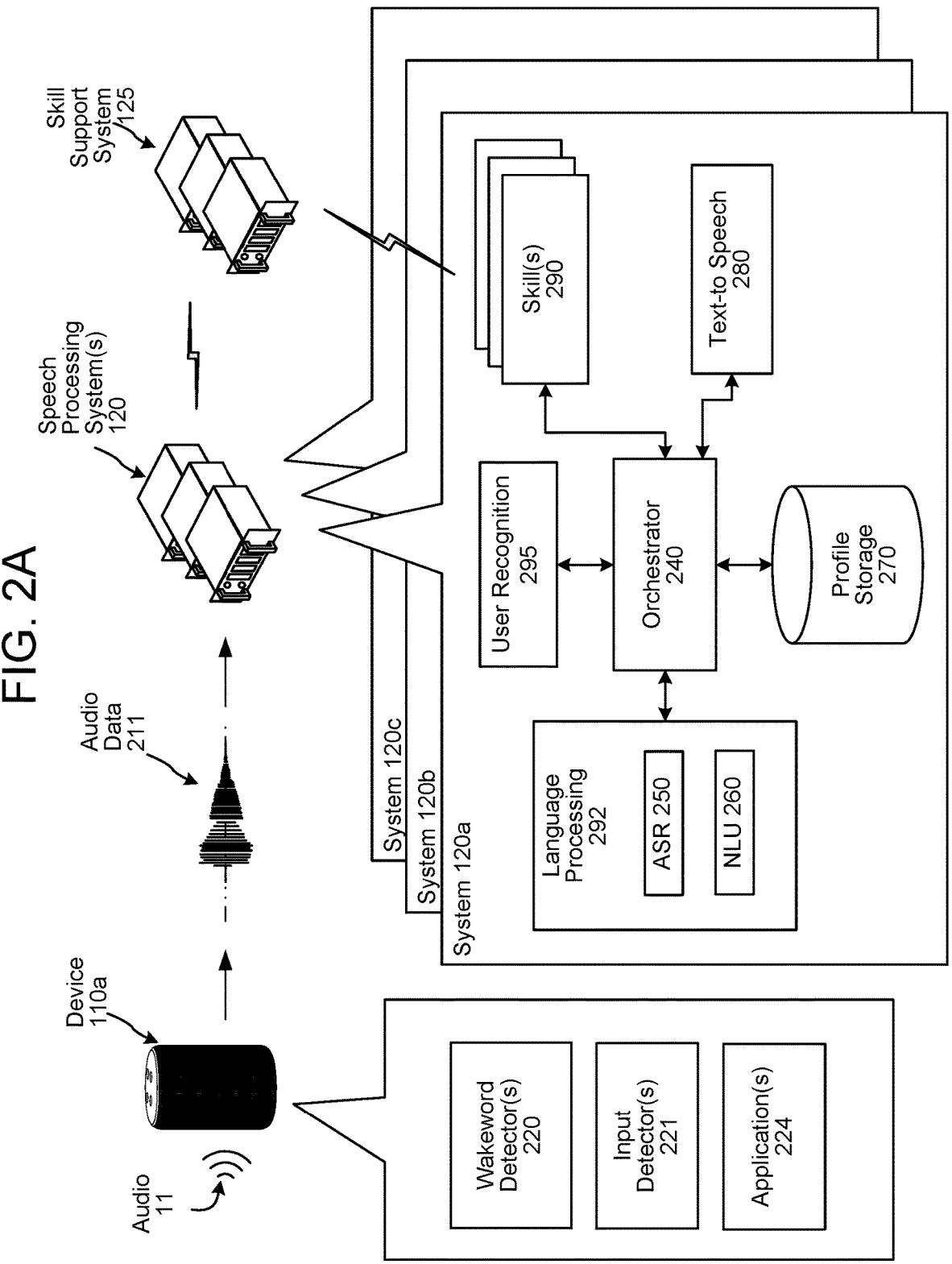

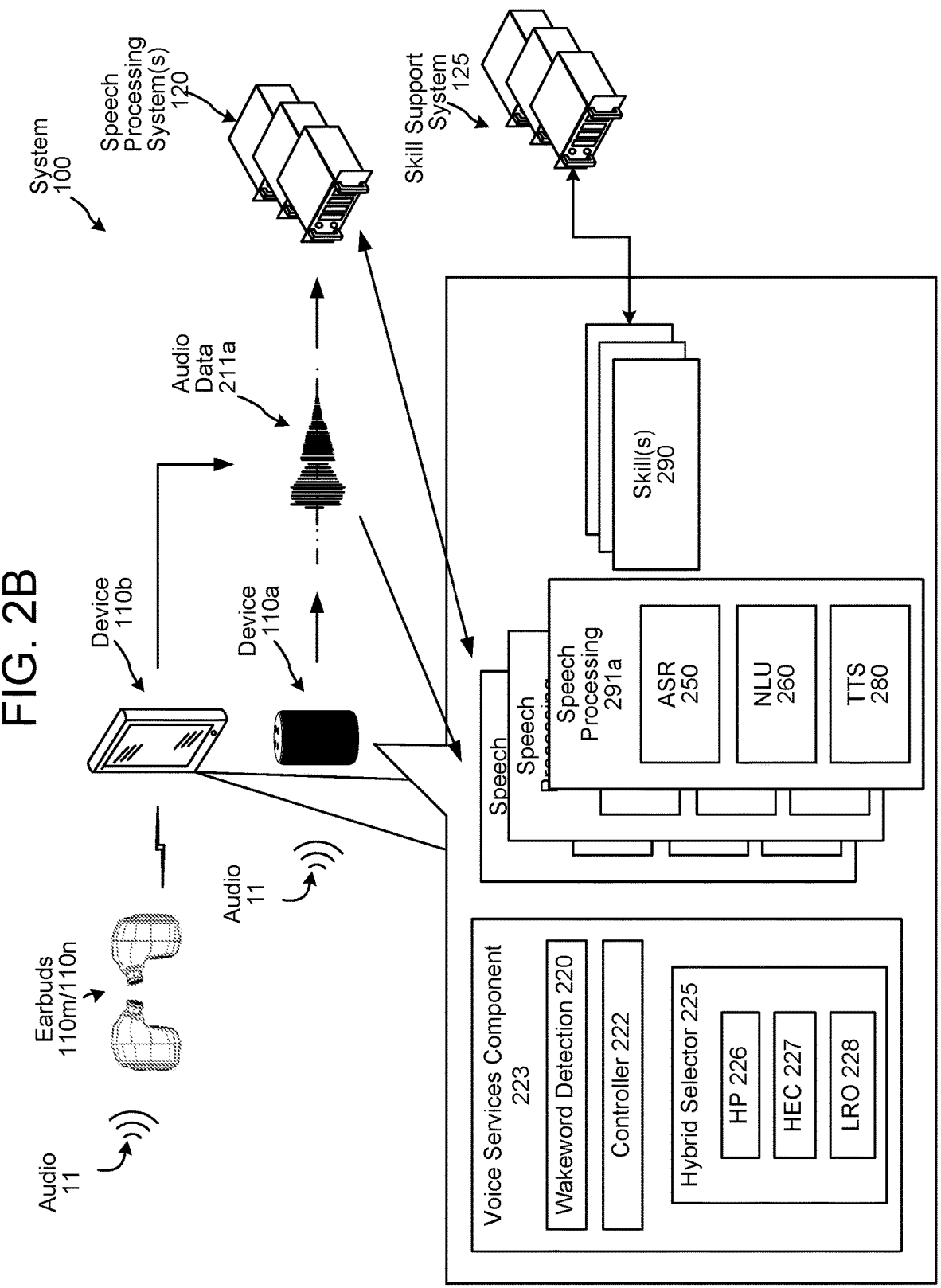

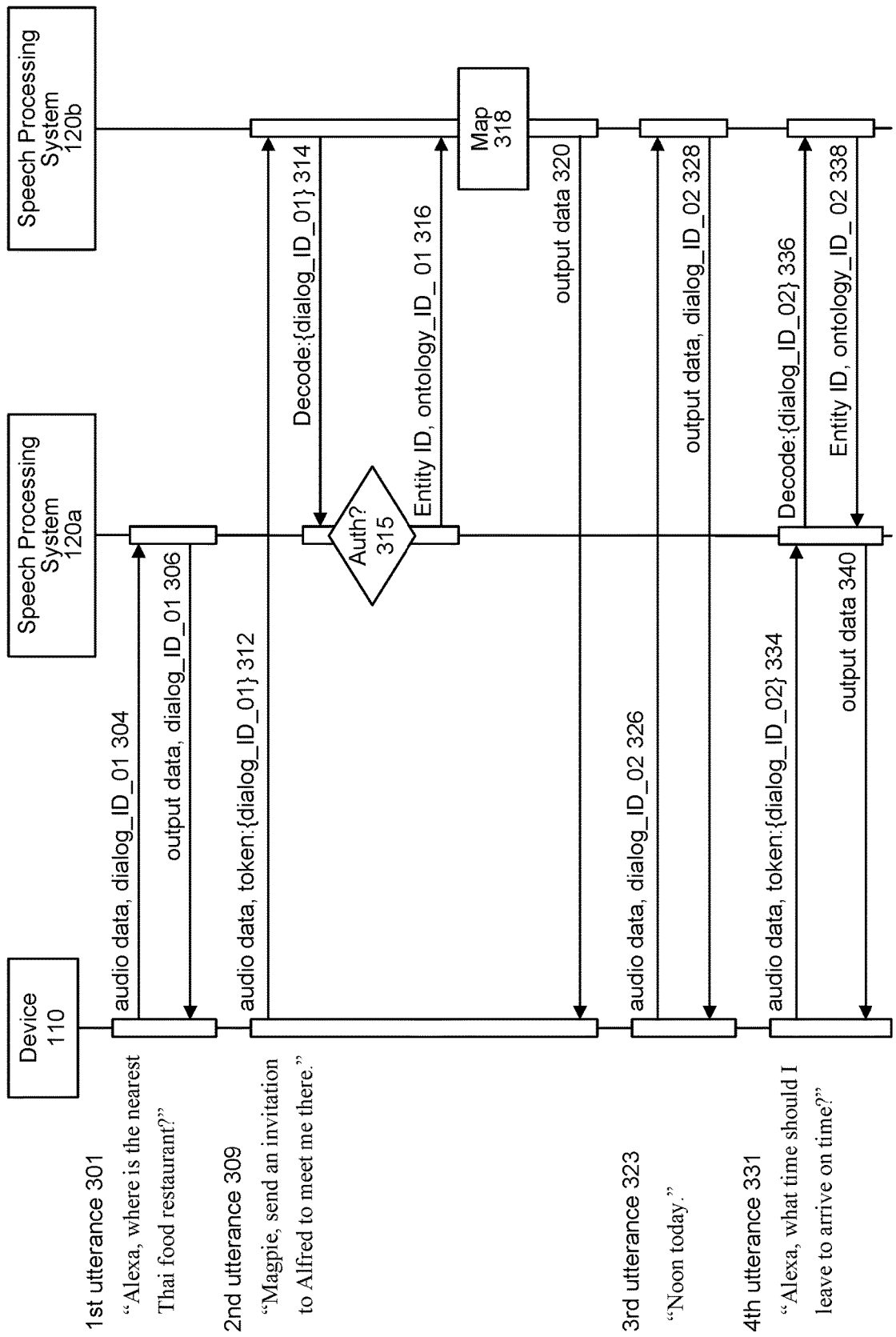

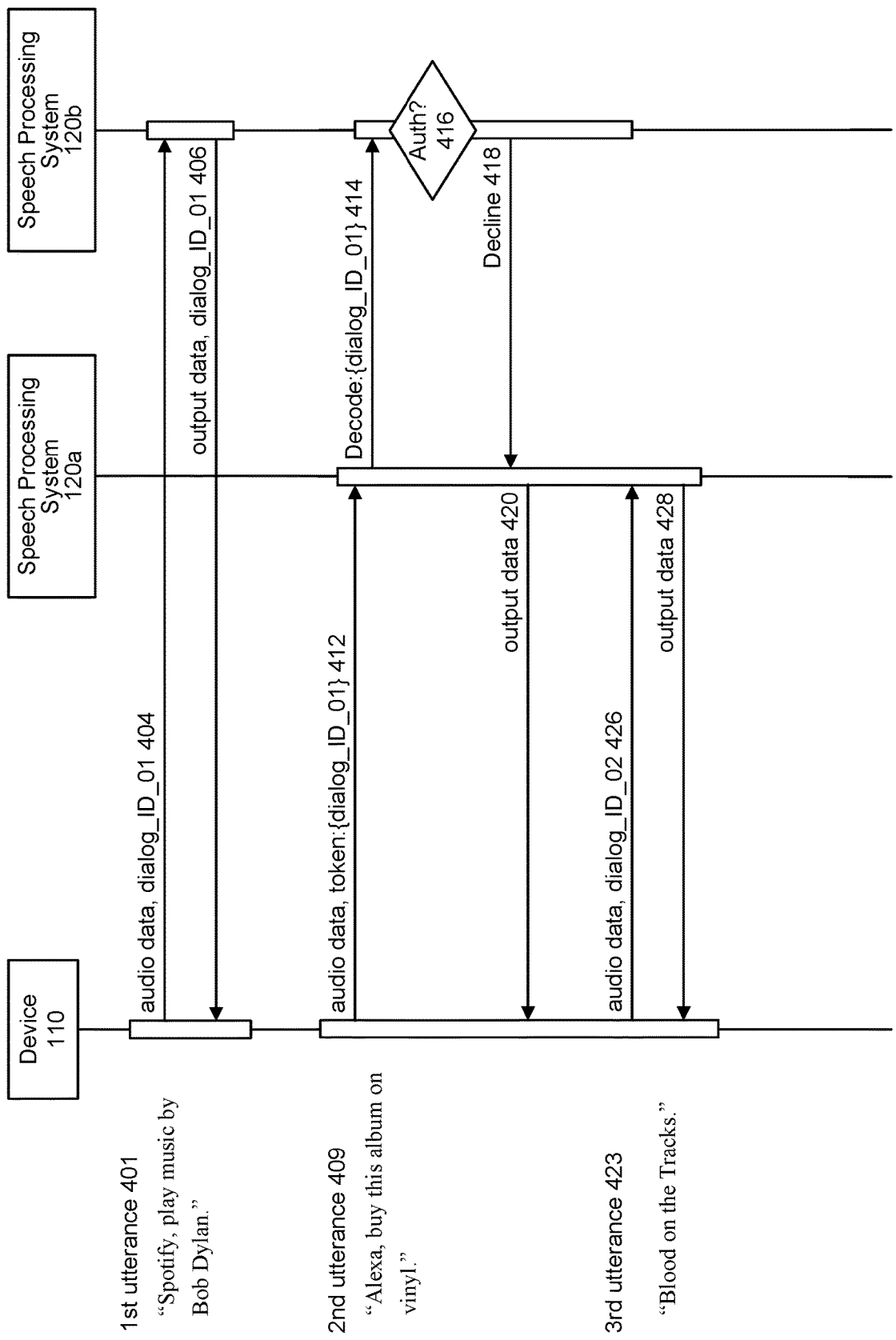

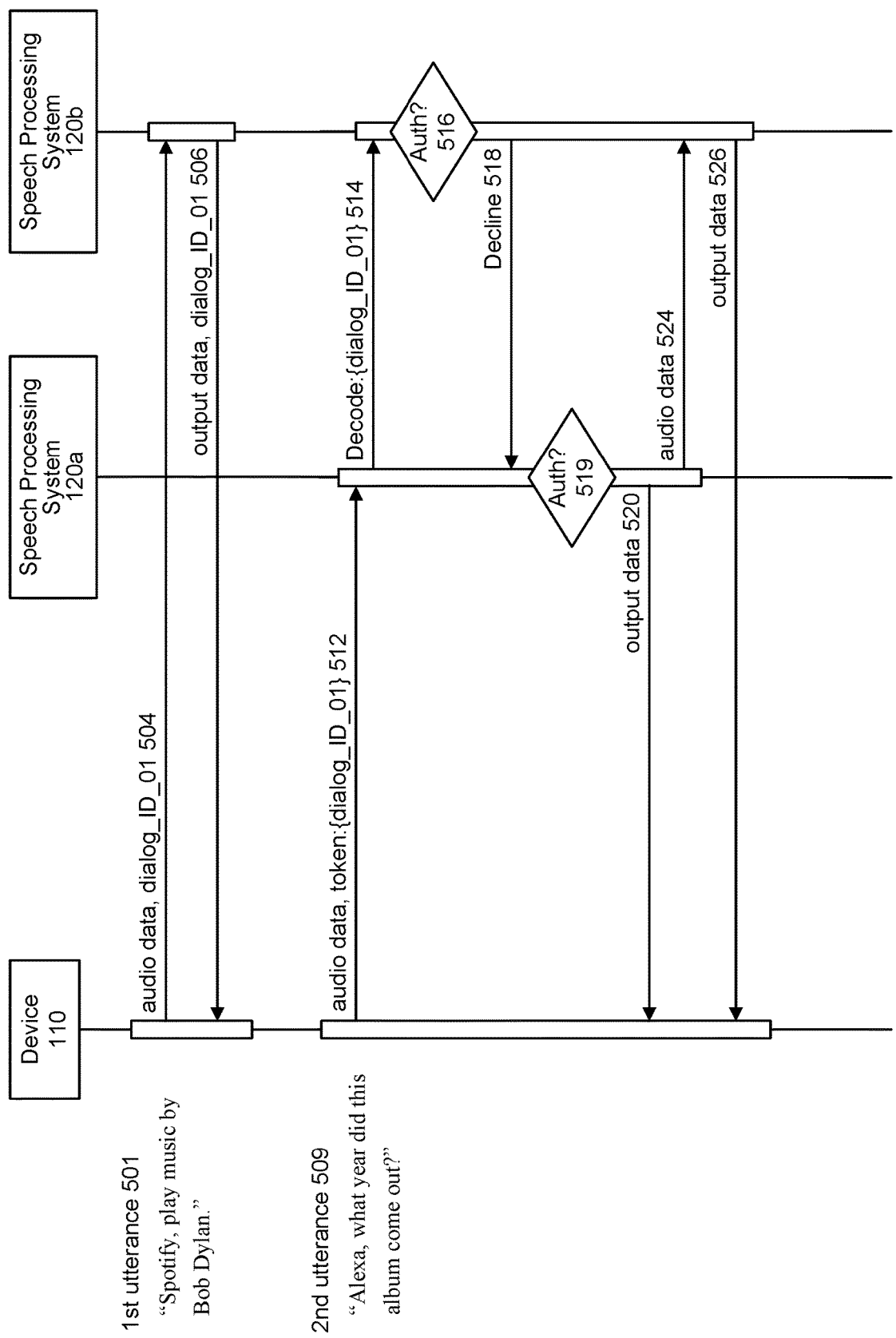

SPEECH PROCESSING SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2A is a block diagram illustrating language processing components of the system, according to embodiments of the present disclosure.

FIG. 2B is a block diagram illustrating language processing components that may be included in a language processing device according to embodiments of the present disclosure.

FIG. 3 is a signal flow diagram illustrating first example operations of the system, according to embodiments of the present disclosure.

FIG. 4 is a signal flow diagram illustrating second example operations of the system, according to embodiments of the present disclosure.

FIG. 5 is a signal flow diagram illustrating third example operations of the system, according to embodiments of the present disclosure.

DETAILED DESCRIPTION

Figure 1:
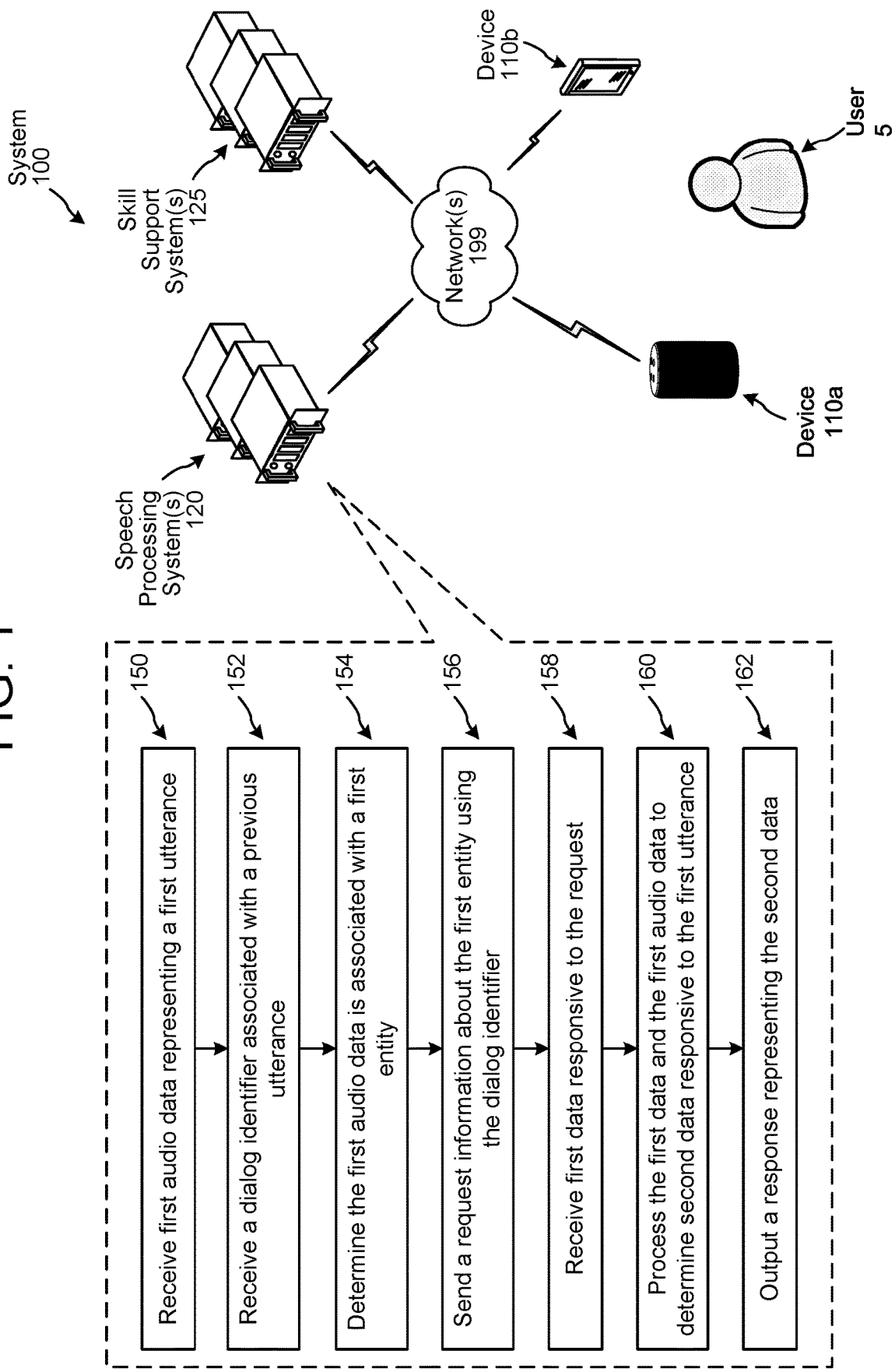
FIG. 1 is a conceptual diagram illustrating a system configured to share entity information between respective speech processing systems, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech. ASR, NLU, and TTS may be used together as part of a speech-processing system.

A system may be configured to perform actions and/or provide responses responsive to user inputs (e.g., spoken inputs and/or typed inputs). For example, a system may be configured to output weather information in response to a user input including "Alexa, what is the weather." As a further example, a system may be configured to adjust settings in a smart home environment in response to a user input including "Alexa, dim the living room lights." The system may be further configured to perform an action, such as lowering a window of an automobile, in response to a user including "Alexa, roll down my window."

A device may be configured to receive a spoken user input, detect a wakeword (e.g., the aforementioned "Alexa") in the user input, determine a command or other type of request in the user input, and perform an action and/or otherwise respond to detecting the wakeword and/or determining the request. For example, in response to the device detecting the wakeword, the device may send audio data, representing the user input, to a system for processing (e.g., speech processing).

In certain system configurations, a device may be configured to detect more than one wakeword, where different wakewords may correspond to different speech processing systems or components associated with a speech processing system. For example, the wakeword "Alexa" may cause input data to be processed by one system, the wakeword "Car" may cause input data to be processed by another system, the wakeword "Magician" may cause input data to be processed by still another system, and so on. Thus, based on the wakeword spoken, one or more particular ASR, NLU, and/or TTS components of a speech processing system may be selected for performing speech processing. Different ASR, NLU, and/or TTS components may have different sets of corresponding actions that may be performed in response to receiving the user input. Further, different TTS components may be associated with different speech styles for purposes of TTS processing. Even further, different ASR, NLU, and/or TTS components may correspond with different feedback mechanisms such as customized sounds that are output with one system versus another, customized light emitting diode (LED) colors or other graphical user interface (GUI) visualizations used with one versus another, etc. The availability of different speech processing components that are activated using different wakewords, can perform different actions, can have different TTS voices, and/or different feedback mechanisms may allow a speech processing system to provide a customer experience of having different "personalities" with respect to different voice assistants depending on the wakeword and/or request of a particular utterance.

In some cases, natural language inputs may take the form of a dialog in which a user inputs a series of commands (e.g., natural language speech and/or text). The user may input a second command that references information of a first command and/or returned by the system in response to the first command. For example, the user may ask the system to play a song. The user may subsequently ask the system to "buy this album on Vinyl." In this example, "this album" represents an anaphora that refers back to the requested song. If both commands are handled by the same speech processing system, then the system may be able to resolve both requests, because it may have the context necessary to understand the anaphora. If, however, the first and second commands invoke different speech processing systems, the anaphora in the user's second command may result in the second speech processing system lacking context necessary to resolve the second command. The system may then return an error. Furthermore, the respective speech processing systems may be owned or controlled by different entities. These entities may be competitors, or may otherwise have reasons to prevent unfettered access by other entities to information regarding customer requests. In addition, users may have more and/or different trust level with one entity (e.g., with respect privacy) as compared to another entity. For example, one entity may be trusted with the user's location data for navigation functionality while another entity may be trusted with contact information for communications functionality.

This disclosure therefore describes, among other things, systems and methods for sharing anaphora and contextual carryover between speech processing systems in a manner that allows both entities and users to control what information is shared between speech processing systems. The techniques involve sending, by the second speech processing system to the first speech processing system, an obfuscated token. The first speech processing system may respond with an entity that corresponds to the token. In some implementations, the first speech processing system may respond with an entity subject to an entity information sharing policy and/or user permissions authorizing such information sharing. In some implementations, the obfuscated token may be accompanied by a type parameter that specifies what type of entity the second speech processing system is trying to resolve; for example, location, artist name, etc. A type can also be associated with an intent, a domain, or a topic. The first speech processing system may limit responses to only entities of this type, which can further limit what information the first speech processing system exposes to the second speech processing system. Additional policies may restrict information sharing to only the last command received, the last n commands received, or commands received only during the last few minutes.

In some implantations, various speech processing systems may organize entity libraries based on different ontologies or other types of schema. For example, the speech processing systems may categorize entity types differently. Accordingly, some implementations may include mapping between ontologies of different speech processing systems.

Another advantage of some of the systems and methods described herein is increased flexibility in modifying information sharing permissions as entity relationships evolve through collaboration or acquisitions. Rather than one or both entities changing their schemas, which may fundamentally alter the operation of their speech processing systems, the token-based approach described herein can allow the speech processing systems to adjust information sharing permission settings to allow greater and easier access to information.

In addition to user permissions regarding the sharing of information between or among speech processing systems, the system may be configured to incorporate other user permissions and may only perform activities disclosed herein if approved by a user. As such, the systems, devices, components, and techniques described herein can be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a system 100 configured to share entity information between respective speech processing systems, according to embodiments of the present disclosure. As shown in FIG. 1, the system 100 may include one or more devices 110*a* and 110*b* (collectively "devices 110") local to a user 5, one or more speech processing system(s) 120 (abbreviated "system 120"), and one or more skill support systems 125 connected across one or more networks 199. While the user 5 is illustrated as being a human, other types of users (e.g., computing systems) may exist. Although the figures and discussion of the present disclosure illustrate certain steps in a particular order, the steps described may be performed in a different order (as well as certain steps removed or added) without departing from the present disclosure.

The device 110*a* may receive audio corresponding to a spoken natural language input originating from the user 5. The device 110*a* may record audio following detection of a wakeword. The device 110*a* may generate audio data corresponding to the audio, and may send the audio data to the system 120. The device 110*a* may send the audio data to the system 120 via an application that is installed on the device 110*a* and associated with the system 120. An example of such an application is the Amazon Alexa application that may be installed on a smart phone, tablet, or the like. Similarly, the device 110*b* may receive text data corresponding to a natural language input originating from the user 5, and send the text data to the system 120. The device 110*b* may also receive audio, generate audio data corresponding to the audio, and send the audio data to the system 120. Examples of various devices 110 are further illustrated in FIG. 14. In some cases, the system 120 may include multiple speech processing systems accessible via the device 110. The respective speech processing systems may respond to different wakewords and perform different services, which may, in some cases, relate or overlap.

The following describes example operations for sharing entity information between respective speech processing systems. The system 120 can receive audio data representing an utterance (150). The system 120 can receive a dialog identifier associated with a previous utterance (152). The system 120 can determine that the first audio data is associated with a first entity (154). The system 120 may send a request for information about the first entity using the dialog identifier (156). The system 120 can receive first data responsive to the request (158). The system 120 can process the first data and the first audio data to determine second data responsive to the first utterance (160). The system 120 can output a response representing the second data (162).

The system 120 can receive audio data representing an utterance (150). The user 5 may speak the utterance to the device 110, which digitizes it to generate the audio data before sending it to the system 120 via the network 199. The device 110 may detect a wakeword in the audio data, and direct the audio to a first speech processing system corresponding to the wakeword.

The device 110 can associate each utterance with a dialog identifier. The dialog identifier can be used to refer back to the utterance and/or data generated from, or in response to, the utterance. A dialog identifier can correspond to a particular utterance, an invocation of a wakeword, a particular dialog following the wakeword, or a particular user. A dialog identifier may resent or increment following each detected wakeword, each utterance, each new dialog, each new user, or after a predetermined elapsed time. As described further below, the system 120 can use the dialog identifier to facilitate requests for, and sharing of, entity information related to an utterance. The device 110 and the system 120 can store the dialog identifier for a finite period of time to facilitate the sharing of entity information between speech processing systems; for example, to resolve an anaphora in the utterance.

The system 120 can receive a dialog identifier associated with a previous utterance (152). The first speech processing system that is processing the audio data may receive the dialog identifier associated with a previous utterance; that is, a previous utterance other than the one it is currently processing. The previous utterance may have been (or is currently being) handled by a second speech processing system different from the first speech processing system. The second speech processing system may have been invoked by a wakeword different from the wakeword associated with the utterance received at step 150.

The system 120 can determine that the first audio data is associated with a first entity (154). The first speech processing system may process the audio data using ASR and/or NLU to determine an intent and at least one entity mention. ASR and NLU are discussed further below with reference to FIGS. 2, 8, and 9. In some cases, the first speech processing system may determine that the audio data is associated with a first entity. This can occur when the utterance represented by the audio data includes a reference to information in the previous utterance received by the second speech processing system. Similarly, it can also occur when the utterance references information provided by the second speech processing system in the response to the previous utterance. The reference to the first entity may be explicit or implied. For example, the reference to the first entity may refer to an anaphora such as "it," "this," "there," etc., that refers back to information not represented in the utterance. For example, the second speech processing system may be associated with a music streaming service, which may be playing a song based on a request from the user in the previous utterance. The audio data may represent a request pertaining to music playing; for example "Alexa, buy this album." The wakeword "Alexa" may invoke the first speech processing system, which may not have sufficient context to resolve the phrase "this album." In some cases, the utterance may include a command such as "play" or "stop" that implicates a streaming operation provided by a different speech processing system. The utterance may thus fail unless the first speech processing system can retrieve the necessary contextual information from the second speech processing system.

The system 120 may send a request for information about the first entity using the dialog identifier (156). To resolve the first entity, the first speech processing system may request information from the second speech processing system. While the user may make use of the services of both speech processing systems though the device 110, the different speech processing systems may be associated with different entities, which may be separate organizations. An entity may not wish to allow other entities unfettered access to user data and/or usage data. Furthermore, users themselves may not want an entity sharing their usage data with other entities. Therefore, the requesting speech processing system can request entity information using the dialog identifier, and the responding speech processing system can determining how to respond based on information sharing policies and user permissions (e.g., privacy settings).

The first speech processing system can therefore send a request for information about the first entity to a second speech processing system different from the first speech processing system. The request can include an obfuscated token. The token can include the dialog identifier, which can identify an utterance previously received by the device 110. In some implementations, the token can be made globally unique by, for example, combining the dialog identifier with an entity identifier. In some implementations, an expiry time can be included. In yet further implementations, the token may include additional information, such as an entity type, which can be used by the responding speech processing system to filter possible responses and/or apply different permissions and/or policies depending on the entity type. The entity type can identify a topic, intent, category, etc. of the requested entity.

Figure 7:
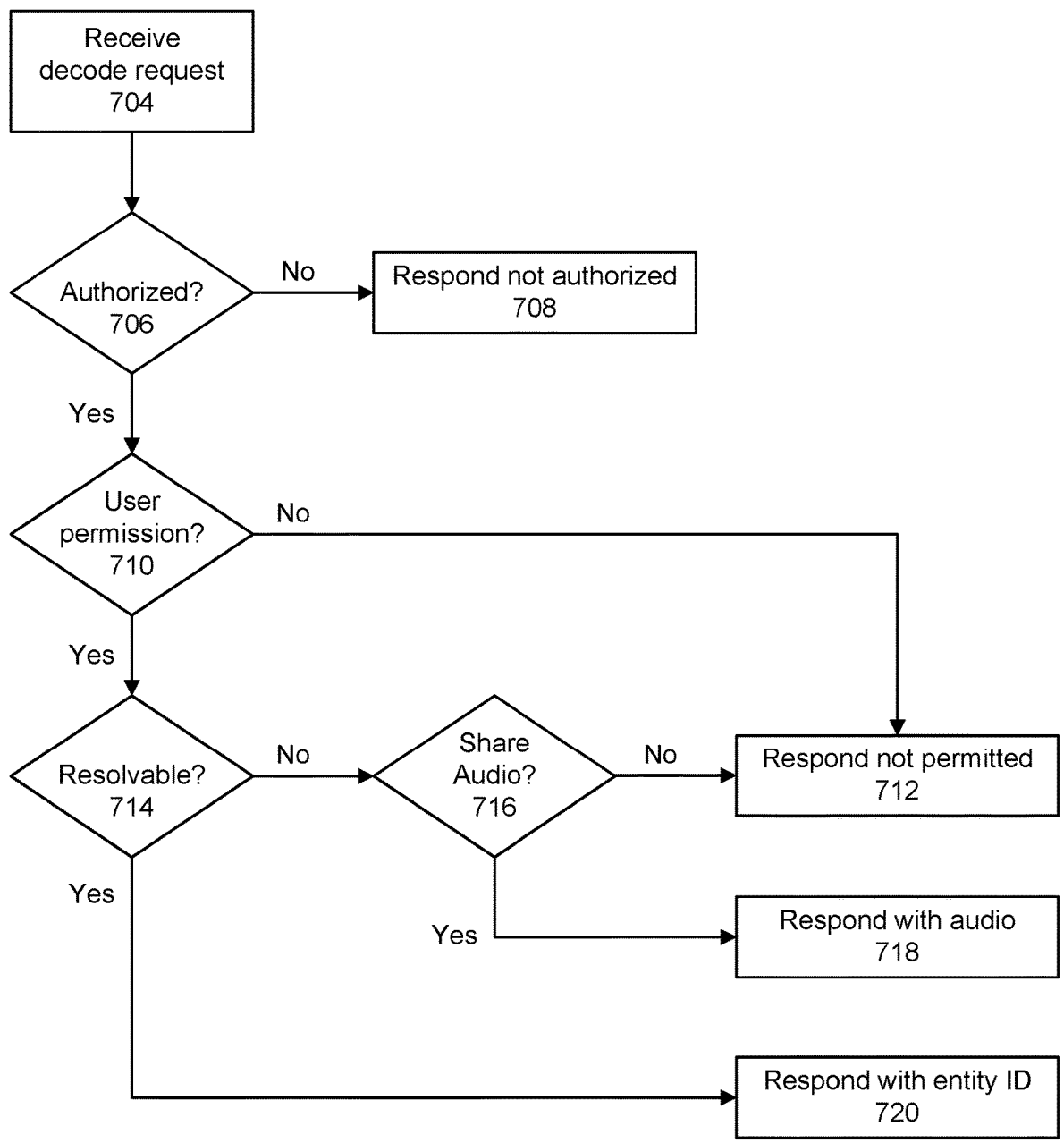
FIG. 7 is a flowchart illustrating example operations of a speech processing system handling a request to resolve an anaphora, according to embodiments of the present disclosure.

The second speech processing system may maintain information related to the dialog identifier for a limited time. The second speech processing system may, upon receiving the request and subject to certain conditions, respond with information about an entity corresponding to the dialog identifier. Such conditions may include user permissions and/or entity information sharing policies. Users may set permissions that dictate when and how the speech processing system may share the users' information with other speech processing systems. For example, one user may not wish for a speech processing system to share any information related to the user's use of the speech processing system, while another user may allow information sharing for the purpose of improving the user experience. For example, by giving the second speech processing system permission to share entity data for the purpose of resolving anaphora in the user's utterances, the user may experience better service from the first speech processing when referencing information provided to or received from the second speech processing system. Similarly, entities may hesitate to share information about user's search and use of their speech processing systems with entities having other, possibly competing speech processing systems. On the other hand, entities may acquiesce to limited sharing of information if doing so can improve the user experience and increase adoption and use of their services. FIG. 7, described further below, shows a flowchart illustrating example operations of a speech processing system handling a request to provide information related to an anaphora.

The system 120 can receive first data responsive to the request (158). Depending on characteristics of the request, user privacy settings, information sharing policies, and timeliness, the second speech processing system may send a response back to the first speech processing system in any one of a number of ways. For example, if the second speech processing system is permitted by the settings and policies to respond to the request, and recognizes the dialog identifier in the token, the second speech processing system may attempt to use the token to identify an entity responsive to the request. If the second speech processing system can determine the entity, it may respond with an entity identifier corresponding to the entity. If the second speech processing system cannot determine the entity, it may, subject to further permissions and policies, respond with data representing the audio data of the previous utterance; for example, ASR output data. In some cases, the second speech processing system may decline to provide information due to lack of permission or a prohibitive policy, and the second speech processing system may respond accordingly. In some cases, the second speech processing system may fail to identify information responsive to the request due to expiration of the token or purging of data related to the previous utterance due to a passage of time, and thus respond that it was unable to identify responsive information.

In some implementations, the second speech processing system may respond based on information not necessarily related to a previously received utterance. Indeed, in some implementations, the first speech processing system may send a request to an application without speech processing capabilities. For example, the user may reference an item such as contact data maintained in an address book application or event data maintained in a calendar application. Such might occur if a user interacts with a speech processing system with to, for example, request driving directions to an appointment when the speech processing system and the calendar application are associated with different entities, or to initiate a voice call to a contact when the address book application is associated with yet another entity. In such cases, the first speech processing system may send a request including a token provided by the system 120 that can enable the first speech processing system to send the request to the calendar application or address book application.

The system 120 can process the first data and the first audio data to determine second data responsive to the first utterance (160). The first speech processing system can use the first data received in the response from the second speech processing system to complete the processing of the first audio data. If the first data includes an entity, the first speech processing system can service the user request conveyed in the utterance, if possible.

In some cases, the first speech processing system and the second speech processing system may use different ontologies for categorizing entities. In such cases, the first speech processing system may need to translate, or map, the entity to its own ontology. For example, the speech processing system may determine that the first data corresponds to a first entity ontology, determine a correspondence between the first entity ontology and a second entity ontology, and determine, based on the correspondence between the first entity ontology and the second entity ontology, that the first data corresponds to a first entity. The first speech processing system may then determine the second response data based on the first entity.

In some cases, the second speech processing system may provide first data in the form of data representing the previous utterance. The first speech processing system may then perform additional speech processing on the first data to resolve the entity.

Figure 6:
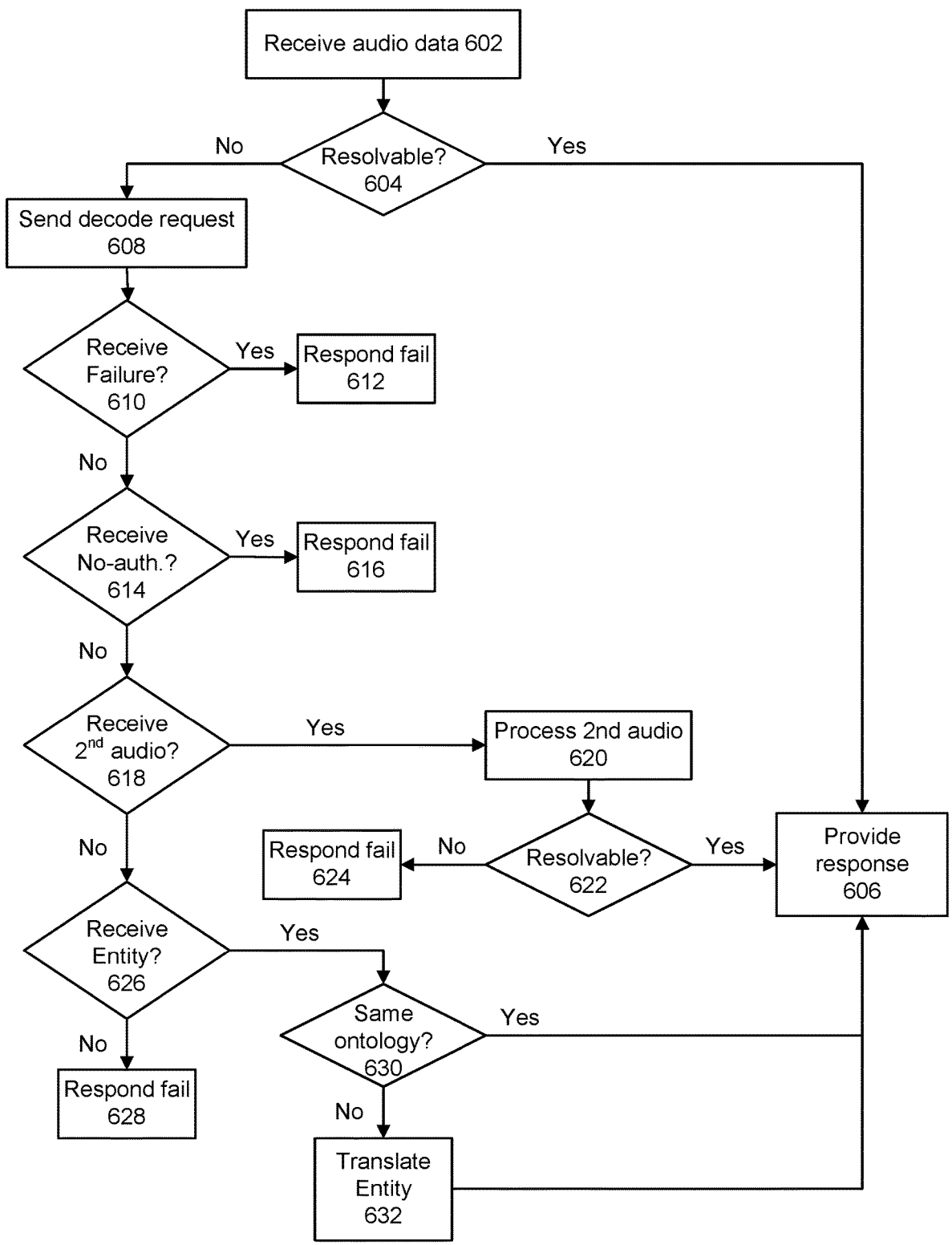
FIG. 6 is a flowchart illustrating example operations of a speech processing system attempting to resolve an anaphora, according to embodiments of the present disclosure.

In some cases, the first speech processing system may receive a failure of some type from the second speech processing system. In the event of a failure to resolve the entity mention, the first speech processing system may relay the failure to the user, and possibly provide details of the error (failure to resolve, lacked permission, etc.). In some implementations, the first speech processing system may output a recommendation to the user that the user direct the request to the second speech processing system. FIG. 6, described further below, shows a flowchart illustrating example operations and outcomes of a system processing system attempting to resolve an anaphora.

The system 120 can output a response representing the second data (162). Once the first speech processing system processes the first data and the first audio data to determine second data responsive to the first utterance, the first speech processing system can generate and output a response to the user. The response can represent the second data. The response can deliver information (i.e., provide navigation), perform a service (e.g., make a purchase), or relay a failure. In some implementations, the first speech processing system may process the second data using TTS to generate a response in the form of verbal output. TTS is discussed further below with reference to FIG. 11. In some implementations, the output can be a combination of a service and a verbal message; for example, the first speech processing system, upon request, may send a meeting invitation to a user's contact and additionally respond to the user with a verbal confirmation that the invention has been sent. These and other use cases are described below with reference to FIGS. 3-5.

The system 100 may operate using various components as described in FIG. 2A. The various components may be located on same or different physical devices. Communication between various components may occur directly or across a network(s) 199. As described in greater detail below, the device 110 may include a wakeword detector 220 for detecting one or more wakewords, an input detector 221 for detecting user input such as a button press or touch-screen touch, and one or more applications 224 for providing output and/or changing a state of the device 110.

An audio capture component(s), such as a microphone or array of microphones of a device 110, receives audio 11 and creates corresponding audio data. The wakeword detector 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector 220 may determine that audio data corresponding to the audio 11 contains a representation of a wakeword (as described in greater detail below); the device 110 may thereafter send the audio data to the speech processing system(s) 120. An example wakeword is "Alexa." In some implementations, the device 110 may respond to more than one wakeword, each wakeword associated with a different speech processing system 120*a*, 120*b*, or 120*c* (collectively, "speech processing systems 120"); for example, the wakeword "Alexa" may implicate the speech processing system 120*a* while the wakeword "Magpie" may implicate the speech processing system 120*b*. The device 110 may route audio data 211 or other data following a wakeword to the corresponding speech processing system 120. The device 110 may instead or in addition send the audio data to the speech processing system(s) 120 when an input detector 221 detects an input—such as a key press, button press, touch-screen touch—corresponding to sending the audio data is detected. An example button is a "Push to Talk" button. In either event, the device 110 sends the audio data to the speech processing system 120.

The wakeword detector 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 220 and/or input is detected by the input detector 221, the device 110 may wake and begin transmitting audio data 211, representing the audio 11, to the system(s) 120. The audio data 211 may include data corresponding to the wakeword; in other embodiments, the portion of the audio corresponding to the wakeword is removed by the device 110 prior to sending the audio data 211 to the system(s) 120. In the case of touch input detection, the audio data may not include a wakeword.

Regarding the wakeword detector 220, Viterbi decoding may be performed for a competing foreground wakeword path and background speech/nonspeech path, and wakeword hypothesis may be triggered when a log-likelihood ratio of the foreground path versus the background path exceeds a predetermined threshold. Once the ratio exceed the predetermined threshold, features may be extracted from the audio data and fed into one or more second stage classifiers, which could be a support vector machine (SVM) or deep neural network (DNN).

In various embodiments, the wakeword detector 220 may use one of a plurality of wakeword-detection models. The wakeword detector 220 may, for example, be implemented on a DSP that includes an interface, such as an application-programming interface (API), that allows communication with another system or device, such as the device 110. In some embodiments, the wakeword detector 220 includes a plurality of wakeword-detection models; in these embodiments, the other device or system sends a command, via the API, to instruct the wakeword detector 220 to use a different wakeword-detection model but need not send data corresponding to the model.

In some implementations, the device 110 may select a new wakeword-detection model based on the location of the device 110. Such a feature may be useful, for example, if the device 110 is a smart vehicle or a standalone device 110 being used temporarily, semi permanently, or permanently in a vehicle. The device 110 may determine its location by processing input from one or more input devices. These input devices may include, for example, a camera, a microphone, an accelerometer, a gyroscope, a biometric sensor, a global positioning system (GPS), a thermometer, an antenna, or other such sensors. The device 110 may instead or in addition determine its location by receiving location data from another device, such as the server 120.

The device 110 may process input from multiple sensors to determine the location. For example, if the GPS or accelerometer of the device 110 indicates a speed corresponding to travel in a device, the device 110 may process input from an additional sensor (e.g., a microphone or camera) to determine the type of device and its corresponding location. If, for example, the audio data includes a representation of road noise but not a representation of speech from multiple speakers, the device 110 may determine that the device is an automobile and that the location is a private location. If, however, the audio data includes a representation of speech from multiple speakers, the device 110 may determine that the device is a bus or train and that the location is a public location. Similarly, the device 110 may process image data captured by the camera and compare the captured image data to stored image data of automobiles and busses to determine the type of device.

The wakeword-detection models may be implemented for their corresponding locations via training, as described herein, using location-specific training data. For example, the home-location wakeword-detection model may be trained using speech data corresponding to speech of a user and/or family member; home-location wakeword-detection model may instead or in addition be trained using speech data from other persons to, for example, distinguish between adult and child voices. The public-location wakeword-detection model may be trained using speech data corresponding to the wakeword being uttered in a noisy location. The wakeword-detection models corresponding to other locations may be trained using data corresponding to their locations.

In various embodiments, the wakeword-detection model of the wakeword detector 220 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector 220 may determine a similarity score for the candidate wakeword based on how similar it is to the stored wakeword; if the similarly score is higher than the wakeword-detection threshold, the wakeword detector 220 determines that the wakeword is present in the audio data, and if the similarity score is less than the wakeword-detection threshold, the wakeword detector 220 determines that the wakeword not is present in the audio data. For example, if the candidate wakeword matches the stored wakeword very closely, the wakeword detector 220 may determine a similarity score of 100; if the candidate wakeword does not match the stored wakeword at all, the wakeword detector 220 may determine a similarity score of 0. If the wakeword detector 220 determines candidate wakeword partially matches the stored wakeword, it may determine an intermediate similarity score, such as 75 or 85.

Though the disclosure herein describes a similarity score of zero to 100—wherein zero is least similar and 100 is most similar—and though the following examples carry through this type of similarity score, the present disclosure is not limited to any particular range of values of the similarity score, and any system or method of determining similarity between a candidate wakeword represented in received audio data and a stored representation of the wakeword is within the scope of the present disclosure.

The system may also use different wakewords for different skills within a same speech processing system. For example, a user may speak "Ford" as a special wakeword to invoke a specific skill or processing speech processing system within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing system (which may be a first speech processing component (e.g., skill, etc.) within the first speech processing system) as well as determine a second confidence that the detected wakeword is a second wakeword associated with a second speech processing system (which may be a second speech processing system or a second, different, component (e.g., skill, etc.) within the second speech processing system. The different systems may be associated with different ASR processing, different NLU processing, different commands/intents, or other differences.

Upon receipt by the speech processing system(s) 120, the audio data 211 may be sent to an orchestrator component 240. The orchestrator component 240 may include memory and logic that enables the orchestrator component 240 to transmit various pieces and forms of data to various components of the system, as well as perform other operations as described herein.

The orchestrator component 240 may send the audio data 211 to a language processing component 292. The language processing component 292 includes an ASR component 250 and an NLU component 260. ASR and NLU are discussed further below with reference to FIGS. 2, 8, and 9. The various speech processing systems 120 may perform different but possible overlapping functions. In some embodiments, a first speech processing system 120a may be a general-purpose speech processing system and may provide such skills and applications as weather forecasts, restaurant reservations, shopping services, and Internet searches; a second speech processing system 120b may be a device-specific speech processing system and may provide such skills and applications as changing a state of the device 110 (e.g., raising/lowering a window, setting a thermostat, adjusting a seat, and providing diagnostic information); a third speech processing system 120c may be a service-specific speech processing system and may provide services such as media streaming. Some applications and skills may be common to one or more speech processing system 120 (e.g., playing music or providing navigation information). The speech processing systems 120 may be under control of different entities. In some cases, the various entities may be partners, indirect competitors, or direct competitors. Any number of speech processing system 120, however, having any type of applications or skills is within the scope of the present disclosure.

The device 110 may assign a dialog identifier to audio data 211 representing a user utterance. The speech processing systems 120 can use the dialog identifier to keep track of the audio data 211 as well as data generated from or in response to the audio data 211. The device 110 may, for example, provide a first dialog identifier in association with first audio data 211 sent to the first speech processing system 120a. The device 110 may then provide a second dialog identifier in association with second audio data 211 sent to the second speech processing system 120b. The device 110 may additionally provide the first dialog identifier to the second speech processing system 120b. The device 110 may do so if the time elapsed between receipt of the second audio data follows receipt of the first audio data by less than a predetermined amount of time; say, a few seconds to a few minutes, or possibly longer. The second speech processing system 120b can use the first dialog identifier to request additional information from the first speech processing system 120a regarding an entity referenced by the second audio data 211.

The speech processing system 120 may processes the audio data 211 using, in some embodiments, one or more components in a language processing component 292, such as an ASR component 250 and an NLU component 260. The language processing component 292 may perform ASR and/or NLU processing to determine a domain, intent, and/or meaning corresponding to the audio data 211. The language processing component 292 may instead or in addition identify keywords in the audio data 211 and identify a domain, intent, and/or meaning corresponding to the keywords. The user recognition component 295 may identify a user associated with an utterance in the audio data 211. The language processing component 292 may use this information to help identify a domain, intent, and/or meaning corresponding to the user. User recognition is discussed further below with reference to FIG. 10. The language processing component 292 may further identify a domain, intent, and/or meaning associated with the audio data 211 based on information in a user profile associated with the user stored in a profile storage 270 (such as usage history information), a location of the device 110, a time of day, week, month, or year, and/or temperature information.

Each language processing component 292 may include an ASR component 250, which may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data or other representative data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The language processing component 292 may further include a NLU component 260 that attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill support system(s) 125, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"— the speech processing system 120 can send a request to another speech processing system 120 for information regarding the entity mention and/or other context related to the utterance. The speech processing system 120 may augment, correct, or base results data upon the audio data 211 as well as any data received from the other speech processing system 120.

The NLU results data may be sent from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis.

A "skill component" may be software running on the system(s) 120 that is akin to a software application. That is, a skill component 290 may enable the system(s) 120 to execute specific functionality in order to provide data or produce some other requested output. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 240 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The speech processing system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like.

Each speech processing system 120 may include a TTS component 280 that generates audio data (e.g., synthesized speech) from text data using one or more different methods. Text data input to the TTS component 280 may come from a skill component 290, the orchestrator component 240, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include a user-recognition component 295 that recognizes one or more users associated with data input to the system. The user-recognition component 295 may take as input the audio data 211 and/or text data output by the ASR component 250. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system. Output of the user-recognition component 295 may also be used for purposes of restricting information sharing between speech processing systems 120 to what is approved based on permissions set by the identified user.

The system(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110. The user profiles may include permission settings dictating how, when, and what information may be shared between the respective speech processing systems 120.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 2B is a block diagram illustrating a system 100 including a speech interface device 110a that is capable of performing speech processing. Optimizing the utilization of on-device computing resources (e.g., processing resources, etc.) of the device 110a can a reduce latency so that the user experience with the device 110a is not negatively impacted by distributed processing tasks taking too long.

As shown in FIG. 2B, a device 110a/110b may include multiple speech processing systems 291 (shown as 291a-291c, though different numbers of such systems are possible). Each local speech processing system 291 may be configured to perform speech processing as described herein relating to speech processing systems 120 (e.g., 120a, 120b, etc.), with the difference that a speech processing system 291 may be configured to perform speech processing locally using components of device 110 without necessarily sending audio data to a remote device for processing.

In such a configuration a wakeword detector 220 may be configured to detect different wakewords (e.g., "Alexa," "computer," etc.) and upon detection of a particular wakeword, send the audio data to and invoke a particular speech processing system 291. For example, if a wakeword is "Alexa" device 110 may send the audio data and invoke speech processing system 291a while if the wakeword is "computer" device 110 may send the audio data and invoke speech processing system 291b, and so on. Thus, the teachings herein (for example as relating to FIGS. 1 and 3-7) related to exchanging data between cloud/remote based speech processing systems 120 (e.g., 120a, 120b, etc.) may also apply to exchanging data between local speech processing systems 291 (e.g., 291a, 291b, etc.). Further, the speech processing/user recognition operations (for example as relating to FIGS. 8-11) described in reference to remote based speech processing systems 120 may also apply to local speech processing systems 291.

Control of where to send the audio data based on the wakeword may be handled by controller 222. For example, a controller 222 may receive one or more outputs of one or more wakeword detectors 220 that indicate that a given wakeword detector 220 has detected the representation of the corresponding wakeword. For example, a first wakeword detector may send, to the controller 22, data indicating detection of the first wakeword. The first wakeword may be associated with a first speech-processing system 120/291.

Before sending corresponding audio data to the first speech-processing system 120a/291a, however, the controller 222 may first determine if first status data indicates that the device 110 is communicating with a second speech-processing system 120b/291b. This communication may include sending, to the second speech-processing system 120b/291b, first audio data, receiving, from the second speech-processing system 120b/291b, second audio data, and/or waiting for a response from the second speech-processing system 120b/291b. The communication may be initiated by a preceding detection of the second wakeword in other audio data and the sending of corresponding audio data to the second speech-processing system 120b/291b. In other words, continuing the example above, the detection of the first wakeword may be the detection of the word "computer" in the utterance, "Alexa, turn on the computer in my office."

If the status data indicates communication with the second speech-processing system 120a/291a, the user device 110 is done processing the audio data with respect to the first speech-processing system 120a/291a, and no further action is taken with respect to the first speech-processing system 120a/291a regarding the audio data. In other words, because the second speech-processing system 120b/291b is already processing corresponding audio data regarding the utterance, the user device 110 does not cause the first speech-processing system 120a/291a to also process the audio data.

If, however, the status data indicates that the user device 110 is not communicating with the second speech-processing system 120b/291b, the controller 222 may determine first status data indicating that the device 110 is communicating with the first speech-processing system 120a/291a.

The device 110 may then communicate with the first speech-processing system 120a/291a. This communication may include sending audio data from the device to the first speech-processing system 120a/291a (via, in some embodiments, an orchestrator component). The communication may further include receiving audio data from the first speech-processing system 120a/291a; this audio data may be responsive to a command represented in the sent audio data, such as a response to a command. The communication may further include waiting, by the user device 110, for the response from the first speech-processing system 120a/291a.

The device 110 may determine that the communication is complete. This determination may include receiving, from the first speech-processing system 120a/291a, an indication of completion, such as release data indicating that no further communication related to the detection of the first wakeword is required. The determination may instead or in addition include determining that a certain amount of time has passed since sending the audio data to the first speech-processing system 120a/291a and/or a certain amount of time has passed since last receiving audio data from the first speech-processing system 120a/291a.

Upon making this determination, the controller 222 may determine second status data indicating the end of the communication. Upon determining this second status data, if and when the first wakeword-detection component again determines that additional audio data includes another representation of the wakeword, the controller 222 may cause sending of corresponding audio data to the first speech-processing system 120a/291a (e.g., because the user device 110 is no longer communicating with the second speech-processing system).

In certain configurations, some of the devices 110a may include a hybrid speech interface which may involve processing both by a local speech processing component, such as a speech processing system 291 and by a remote speech processing component 120. As the device 110a includes the local speech processing component 291, the device 110 may be configured to process audio data locally and/or send the audio data to the remote speech processing system 120 for remote processing. In such a hybrid system, a certain wakeword may invoke both a local speech processing system 291 (e.g., 291a) and a corresponding remote speech processing component 120 (e.g., 120a). In such as system, and as discussed below, if the wakeword detection component 220 detects the particular wakeword for the systems (e.g., "Alexa") the local device may both send the audio data for processing by a remote system (e.g., 120a) and send the audio data for processing by the local speech processing system 291 (e.g., 291a) and While FIG. 2B illustrates the local speech processing system 291 as including an ASR component 250 and/or an NLU component 260, the disclosure is not limited thereto and the local speech processing system 291 may include a spoken language understanding (SLU) component without departing from the disclosure. For example, the SLU component may be configured to receive audio data as an input and generate NLU data as an output, similar to the combination of the ASR component 250 and the NLU component 260.

The device 110a may be located within an environment to provide various capabilities to a user 5, when the user 5 is also in the environment. The environment in which the device 110a is located may be a home or other premises, an automobile, or any similar environment. Such an environment may include other devices including additional devices 110, such as other speech interface devices 110a (e.g., primary devices), and/or secondary devices (e.g., Internet of Things (IoT) devices and/or smart home devices like thermostats, lights, refrigerators, ovens, etc.) that may be controllable by devices 110a. When acting as a hub, the device 110a may be configured to connect a plurality of devices 110 in an environment and control communications among them, thereby serving as a place of convergence where data arrives from one or more devices 110, and from which data is sent to one or more devices 110.

In general, the device 110a may be capable of capturing utterances with microphone(s) and responding in various ways, such as by outputting content (e.g., audio) via an output device(s), which may be loudspeaker(s), a display(s), or any other suitable output device. In addition, the device 110a may be configured to respond to user speech by controlling second devices 110 (e.g., other primary devices 110a, secondary devices, etc.) that are collocated in the environment with the device 110a, such as by sending a command to a second device via an input/output communications interface (e.g., a short range radio), the command instructing an operation to be performed at the second device (e.g., to turn on/off a light in the environment).

As also illustrated in FIG. 2B, in addition to using a built-in microphone(s) to capture utterances and convert them into digital audio data, a first device 110b may additionally, or alternatively, receive audio data from a second device (e.g., device in the environment, such as when the second device captures an audio 11 from the user 5 and sends the audio data to the first device 110. This may occur in situations where the second device is closer to the user 5 (for example, earbuds 11m/110n) and would like to leverage the "hybrid" or other capabilities of the first device 110b.

In a hybrid situation the device 110a may operate in conjunction with and/or under the control of a remote, network-based or network-accessible control system (e.g., the remote speech processing system 120). The remote speech processing system 120 may, in some examples be part of a network-accessible computing platform that is maintained and accessible via one or more network(s) 199 such as wide area network. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices of different users. The network(s) 199 are representative of any type of public or private, wide-area network, such as the Internet, which extends beyond the environment of the device 110a. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110a and other local devices 110 may be connected to a private network associated with the environment of the device 110a (e.g., home, business, etc.), and the devices 110 may communicate with the network(s) 199 via the private network.

In some embodiments, the remote system 120 may be configured to receive audio data from the device 110a, to recognize speech corresponding to an utterance in the received audio data using a language processing component 292, and to perform functions in response to the recognized speech. In some embodiments, these functions involve sending directives (e.g., commands), from the remote system 120 to the device 110a and/or other devices 110 to cause the device to perform an action, such as output an audible response to the utterance via loudspeaker(s), and/or control secondary devices in the environment by sending a control command via the communications interface.

Thus, when the device 110a is able to communicate with the remote system 120 over the network(s) 199, some or all of the functions capable of being performed by the remote system 120 may be performed by sending directive(s) over the network(s) 199 to the device 110a, which, in turn, may process the directive(s) and perform corresponding action(s). For example, the remote system 120, using a remote directive that is included in response data (e.g., a remote response), may instruct the device 110a to output an audible response (e.g., using text-to-speech (TTS)) to a user's 5 question via a loudspeaker of the device 110a, to output content (e.g., music) via the loudspeaker of the device 110a, to display content on a display of the device 110a, and/or to send a directive to a nearby device (e.g., directive to turn on a light). It is to be appreciated that the remote system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted, the device 110a may be configured to compare the audio data 211 to stored models used to detect a wakeword (e.g., "Alexa") that indicates to the device 110a that the audio data 211 is to be processed for determining a local NLU result (e.g., slot data that corresponds to a named entity, label data, and/or intent data, etc.). In some embodiments, the hybrid request selector 225 (further discussed below) may send the audio data 211 to a wakeword detection component 220, which determines whether a wakeword is detected in the audio data 211, and, if a wakeword is detected, this indication may be provided to the hybrid request selector 225 so that the hybrid request selector 225 can route the audio data 211 to the remote system 120 and/or the local speech processing system 291 (e.g., the remote system 120 and the local speech processing system 291 may process the audio data 211 at least partially in parallel, although the disclosure is not limited thereto). If a wakeword is not detected in the audio data 211, this indication may be provided to the hybrid request selector 225 so that the hybrid request selector 225 can refrain from sending the audio data 211 to the remote system 120, and to prevent the local speech processing system 291 from further processing the audio data 211, which does not include the wakeword. The audio data 211 can be discarded in this situation.

The device 110 may also conduct its own speech processing using on-device local speech processing system 291, which may include components such as ASR 250 and NLU 260, similar to the manner discussed with regard to the speech processing system 120. The device 110 may also have internally included or otherwise accessible other components such as skill(s) 290, and/or other components capable of executing commands based on NLU results or other results determined by the device 110a, user recognition component, user profile storage, or other components. As described above with regard to FIG. 2A, the skill(s) 290 may communicate with skill support system 125.

The on-device language processing components, however, may not necessarily have the same capabilities as the speech processing components of the remote system 120. For example, the on-device language processing components may be more particularly configured to handle local-type speech commands, such as those controlling devices or components at a user's home. In such circumstances the on-device language processing may be able to more quickly interpret and execute a smart-home command, for example, than processing that involves the remote system 120. If a device 110 attempts to process a command for which the on-device language processing components are not necessarily best suited, the speech processing results obtained by the device 110 may indicate a low confidence or other metric indicating that the processing by the device 110 may not be as accurate as the processing done by the remote system 120.

A hybrid request selector 225 (or, hybrid request selector component 225) of the device 110a is shown as including a hybrid proxy (HP) 226 (or, hybrid proxy (HP) subcomponent 226), among other subcomponents. The HP 226 can be implemented as a layer within the voice services component 223 and may be configured to proxy traffic to/from the remote system 120. For example, the HP 226 may be configured to send messages to/from a hybrid execution controller (HEC) 227 (or, hybrid execution controller (HEC) subcomponent 227) of the hybrid request selector 225. For example, command/directive data received from the remote system 120 can be sent to the HEC 227 using the HP 226. The HP 226 may also be configured to allow audio data 211 to pass through to the remote system 120 while also receiving (e.g., intercepting) this audio data 211 and sending the received audio data to the HEC 227.

On-device local speech processing system 291 may be configured to process audio data 211 representing user speech. In some embodiments, the hybrid request selector 225 may further include a local request orchestrator (LRO) 228 (or, local request orchestrator (LRO) subcomponent) of the hybrid request selector 225. The LRO 228 is configured to notify the local speech processing system 291 about the availability of new audio data 211 that represents user speech, and to otherwise initiate the operations of the local speech processing system 291 when new audio data 211 becomes available. In general, the hybrid request selector 225 may control the execution of the local speech processing system 291, such as by sending "execute" and "terminate" events/instructions to the local speech processing system 291. An "execute" event may instruct the local speech processing system 291 to continue any suspended execution based on audio data 211 (e.g., by instructing the local speech processing system 291 to execute on a previously-determined intent in order to generate a directive). Meanwhile, a "terminate" event may instruct the local speech processing system 291 to terminate further execution based on the audio data 211, such as when the device 110a receives directive data from the remote system 120 and chooses to use that remotely-generated directive data.

Thus when audio data 211 is received by the voice services component 223, the HP 226 may allow the audio data 211 to pass through to the remote system 120 and the HP 226 may also input the audio data 211 to the on-device speech processing system 291 by routing the audio data 211 through the HEC 227 of the hybrid request selector 225, whereby the LRO 228 notifies the local speech processing system 291 of the incoming audio data 211. At this point, the hybrid request selector 225 may wait for response data from either or both of the remote system 120 or the local speech processing system 291. However, the disclosure is not limited thereto, and in other examples the hybrid request selector 225 may send the audio data only to the local speech processing system 291 without departing from the disclosure. For example, the device 110a may process the audio data locally without sending the audio data to the remote system 120, or the second device 110b may send the audio data to the first device 110a and the remote system 120 directly without departing from the disclosure.

The local speech processing system 291 is configured to receive the audio data 211 from the hybrid request selector 225 as input, to recognize speech in the audio data 211, to determine user intent from the recognized speech, and to determine how to act on the user intent by generating NLU results data which may include directive data (e.g., data instructing a component to perform an action). Such NLU results data may take a form similar to that as determined by the NLU operations by the remote system 120. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local speech processing system 291 (and/or the remote system 120) may be formatted using Java, such as JavaScript syntax, or JavaScript-based syntax. This may include formatting the directive using JSON. In some embodiments, a device-generated directive may be serialized, much like how remotely-generated directives are serialized for transmission in data packets over the network(s) 199. In other embodiments, a device-generated directive is formatted as a programmatic API call with a same logical operation as a remotely-generated directive. In other words, a device-generated directive may mimic remotely-generated directives by using a same, or a similar, format as the remotely-generated directive.

The local speech processing system 291 may process the audio data to determine local NLU data, which may include intent data and/or slot data (e.g., "NLU result") so that directives may be determined based on the intent data and/or the slot data. Thus, the speech processing system 291 may process the audio data and attempt to make a semantic interpretation of the utterance represented by the audio data (e.g., determine a meaning associated with the utterance) and then implements that meaning. For example, the speech processing system 291 may interpret audio data representing an utterance from the user 5 in order to derive an intent or a desired action or operation from the user 5. This may include deriving pertinent pieces of information from the utterance that allow the speech processing system 291 to identify a second device in the environment, if the user, for example, intends to control a second device (e.g., a light in the user's 5 house). The local speech processing system 291 may also provide a dialog management function to engage in speech dialogue with the user 5 to determine (e.g., clarify) user intents by asking the user 5 for information using speech prompts.

In some examples, the speech processing system 291 outputs the most likely NLU response (e.g., hypothesis) recognized in the audio data, or multiple hypotheses in the form of a lattice or an N-best list with individual hypotheses corresponding to confidence scores or other scores (such as probability scores, etc.). In some examples, the speech processing system 291 is customized to the user 5 (or multiple users) who created a user account to which the device 110a is registered. For example, the speech processing system 291 may process the audio data based on known information (e.g., preferences) of the user 5, and/or on a history of previous interactions with the user 5.

NLU results as determined by the device 110a and/or the remote system 120 may include data indicating a confidence and/or estimated accuracy of the results. Such data may come in the form of a numeric score but may also come in different forms such as an indicator of Low, Medium, or High, a ranking, or other data. The confidence data may be set to a similar scale so that confidence data for one set of NLU results (e.g., NLU result data from device 110a) may be evaluated with regard to confidence data for another set of results (e.g., NLU result data from the remote system 120).

Thus an NLU result may be selected as a candidate NLU result usable to respond to the user speech, and the local speech processing system 291 may send local response data (e.g., local NLU result and/or local directive data) to the hybrid request selector 225, such as a "ReadyToExecute" response, which can indicate that the local speech processing system 291 has recognized an intent, or is ready to communicate failure (e.g., if the local speech processing system 291 could not recognize an intent). The hybrid request selector 225 may then determine whether to use directive data from the local speech processing system 291 to respond to the user speech, to use directive data received from the remote system 120, assuming a remote response is even received (e.g., when the device 110a is able to access the remote system 120 over the network(s) 199), or to generate output audio requesting additional information from the user 5.

Directive data is processed to cause the device 110a to perform an action, such as outputting audio via one or more speaker(s), controlling one or more second devices in the environment, etc. In the example of FIG. 2B, the action may be to send a control signal(s) via the communications interface to one or more lights in the kitchen, which may be configured to receive the control signal and perform the "turn off" operation to turn off the kitchen lights.

In some examples, the device 110a and/or the remote system 120 may associate a unique identifier with each utterance. Thus, the device 110a may include the unique identifier when sending the audio data to the remote system 120 and the response data may include the unique identifier to identify which utterance the remote directive data and the remote NLU data corresponds.

In some examples, the device 110a may also include, or be configured to use, skill(s) 290 that may work similarly to the skill(s) 290 described above with regard to the remote system 120. Skill(s) 290 may represent domains that are used in order to determine how to act on an utterance in a particular way, such as by outputting a directive that corresponds to the determined intent, and which can be processed to implement the desired operation. Accordingly, the term "skill" may be used interchangeably with the terms "speechlet," "domain," or "domain implementation." The skill(s) 290 installed on the device 110a may include, without limitation, a smart home skill 290a (or smart home domain) and/or device control skill 290b (or device control domain) to act on utterances with intents to control a second device(s) in the environment, a music skill 290c (or music domain) to act on utterances with intents to play music on a device, such as via loudspeaker(s) of the device 110a, a navigation skill 290d (or a navigation domain) to act on utterances with intents to get directions to a point of interest with a known address, a shopping skill 290e (or shopping domain) to act on utterances with intents to buy an item from an electronic marketplace, and/or the like. In the example described above, the smart home skill 290a may correspond to a group of devices 110 associated with the smart home skill 290a and/or a smart home support 125a, whereas the device control skill 290b may correspond to individual devices 110 that can be controlled by the device 110a. In some examples, one or more devices 110 may be paired with the device 110a and only the device 110a may control these paired devices (e.g., using the device control skill 290b), although the disclosure is not limited thereto.

Additionally or alternatively, the device 110a may be in communication with skill support system 125 without departing from the disclosure. In some examples, the device 110a may also have, or otherwise be in communication with, smart home skill support 125a configured locally. For example, the smart home skill support 125a may be located in a remote environment (e.g., separate location), such that the device 110 may only communicate with the smart home skill support 125a via the network(s) 199. However, the disclosure is not limited thereto, and in some examples the smart home skill support 125a may be configured in a local environment (e.g., home server and/or the like), such that the device 110 may communicate with the smart home skill support 125a via the private network 10.

In order to generate a particular interpreted response, the local speech processing system 291 may apply grammar models and lexical information associated with the respective domains or skill(s) 290 to recognize one or more entities in the utterance. In this manner the local speech processing system 291 may identify "slots" (i.e., particular words in the utterance) that may be needed for later command processing. Depending on the complexity of the local speech processing system 291, it may also label each slot with a type of varying levels of specificity (such as noun, place, city, artist name, song name, device name, or the like). Each grammar model used by the local speech processing system 291 may include the names of entities (i.e., nouns) commonly found in speech about the particular domain (i.e., generic terms), whereas the lexical information (e.g., from a gazetteer) is personalized to the user(s) and/or the device. For example, a grammar model associated with the navigation domain may include a database of words commonly used when people discuss navigation.

Accordingly, the intents identified by the speech processing system 291 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the local speech processing system 291 may parse the utterance to identify words as subject, object, verb, preposition, etc., based on grammar rules and/or models, prior to recognizing named entities. The identified verb may be used by the local speech processing system 291 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The local speech processing system 291 may then search the corresponding fields in the domain-specific and personalized lexicon(s), attempting to match words and phrases in the utterance tagged as a grammatical object or object modifier with those identified in the database(s).

To illustrate a home automation example, the user 5 may utter the expression "Turn on the office light." Whether this utterance is captured by the microphone(s) of the first device 110a or captured by another device 110 (e.g., second input audio data 211b generated by device 110b) in the environment, the audio data representing the utterance is ultimately received by the voice services component 223 executing on the device 110a. While not illustrated in FIGS. 2A-2B, in some examples the voice services component 223 may include a speech interaction manager (SIM) configured to manage received audio data by processing utterances as events. The SIM may also manage the processing of directives that are used to respond to the user speech (e.g., by controlling the action(s) of the device 110a). The SIM may include and/or interact with one or more client applications or skills 290 for performing various functions at the device 110a.

At least part of (e.g., subcomponents of) the hybrid request selector 225 can be implemented as a layer within the voice services component 223 that is located between the SIM and a speech communication library (SCL) (not illustrated), and may be configured to proxy traffic to/from the remote system 120. For example, the hybrid request selector 225 may be configured to pass messages between the SIM and the SCL (such as by passing events and directives there between), and to send messages to/from subcomponents of the hybrid request selector 225 that are configured to select a response (e.g., either local or remote response data) to use in responding to user speech. In this manner, in some examples the hybrid request selector 225 can "snoop" on communication between the SIM and the remote system 120. For example, information (e.g., a remote directive, remote NLU data, etc.) that is contained in the response data can be sent to the hybrid request selector 225. The hybrid request selector 225 may also be configured to allow audio data received from the SIM to pass through to the remote system 120 (via the SCL) while also receiving (e.g., intercepting) this audio data for input to a local speech processing system 291.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 3 is a signal flow diagram illustrating first example operations of the system 100, according to embodiments of the present disclosure. FIG. 3 illustrates a dialog between a user 5 and a device 110 involving two different speech processing systems 120a and 120b. Although the speech processing systems 120 are illustrated as separate, the speech processing systems 120 are not necessarily physically distinct physical systems. In this example, the user 5 interacts with the device 110 to look up a restaurant, send an invitation to a contact, and schedule a departure to ensure timely arrival for the meeting.

The user 5 may speak 301 a first utterance to the device 110. The first utterance may begin with a first wakeword followed by a first request: "Alexa, where is the nearest Thai food restaurant?" The device 110 may send 304 the audio data along with a dialog identifier dialog ID 01 to the first speech processing system 120a for processing. The first speech processing system 120a may return 306 output data accompanied by the dialog ID 01 to the device 110. Output data generally may include responsive data (e.g., an answer to a question asked), confirmation (e.g., or a purchase or other action requested of the first speech processing system 120a), or performance of a requested action (e.g., streaming a requested song or displaying a requested image). Output data may include a natural language message for output. The natural language message may be rendered as output audio data by a Text-to-Speech (TTS) component of the first speech processing system 120a. In this case, the rendered output may be a verbal message, "The nearest Thai food is . . . ."

The user 5 may speak 309 a second utterance to the device 110. The second utterance may begin with a second wakeword corresponding to the second speech processing system 120b, followed by a second request: "Magpie, send an invitation to Alfred to meet me there." In some cases, the user 5 may not differentiate requests to the different speech processing systems using different wakewords, and the device 110 may need to perform initial processing on the audio data to determine the target speech processing system. The device 110 may send 312 the audio data to the second speech processing system 120b along with a context token. The context token may include the dialog identifier dialog ID 01. In some implementations, the context token may include additional information such as an entity identifier corresponding to the first speech processing system 120a.

Upon receiving the audio data, the second speech processing system 120b may not be able to resolve an entity referenced in the audio data. In this example, the second speech processing system 120b may lack sufficient contextual information to resolve the word "there" in the second utterance. The second speech processing system 120b may send 314 a request for information about the first entity to the first speech processing system 120a. The request may include the dialog identifier dialog ID 01 that the second speech processing system 120b received with the audio data. In some implementations, the request may include additional information, such as an entity type of entity that the second speech processing system 120b is attempting to resolve. In this example, the second speech processing system 120b is seeking to resolve an entity of entity type location. The first speech processing system 120a may receive the request and determine 315 whether it has authorization under applicable user permissions and/or entity information sharing policies to share the information requested by the second speech processing system 120b.

FIG. 7, described further below, shows a flowchart illustrating example operations of a speech processing system 120 handling a request for information regarding an entity. In this example, the first speech processing system 120a determines that it has authorization to share the requested information. The first speech processing system 120a, based on the authorization determined at 315 and its ability to determine information about the entity, return 316 entity information to the second speech processing system 120b in response to the request. The response may include an entity identifier, audio data, a failure code, or other information such as information from an address book or calendar.

In some implementations, the first and second speech processing systems 120 may categorize entities according to different ontologies. In such cases, the response from the first speech processing system 120a may additionally include an ontology identifier. The second speech processing system 120b may map 318 the entity identifier from a first entity ontology to a second entity ontology. The second speech processing system 120b may finish processing the request represented by the second utterance using the entity data received from the first speech processing system 120a, and send 320 output data to the device 110. In this case, the second speech processing system 120b may request additional information from the user 5 for performing the requested service. The second speech processing system 120b may cause the device 110 to ask, "Invitation for what time?" The user 5 may answer 323 with a third utterance, "Noon today." The device 110 may send 326 the audio data and a second dialog identifier to the second speech processing system 120b. In this example, the device 20 may apply this new dialog identifier even though the third utterance did not include a wakeword. With this information, the second speech processing system 120b can complete the operation for the user, and return 328 output data and the dialog identifier corresponding to the third utterance to the device 110. The device 110 can deliver a spoken output "Okay, invitation sent."

The user 5 may speak 331 a fourth utterance to the device 110. The fourth utterance may begin with a wakeword followed by a request: "Alexa, what time should I leave to arrive on time?" The device 110 will send 334 audio data representing the fourth utterance and the second dialog identifier (dialog ID 02) to the first speech processing system 120a. In this example, the first speech processing system 120a may lack sufficient contextual information to resolve the phrase "on time" in the second utterance. The first speech processing system 120a may send 336 a request for information to the second speech processing system 120b. The request may include the second dialog identifier dialog ID 02. In some implementations, the request may include additional information, such as an entity type of the entity that the second speech processing system 120b is attempting to resolve. In this example, the second speech processing system 120b is seeking to resolve an entity of type event. The second speech processing system 120b may receive the request and, subject to user permissions, entity information sharing policies, and its ability to determine information about the entity, return 338 entity information to the first speech processing system 120a in response to the request. The response may include information about the event such as the time (i.e., noon) or data representing the event as it exists in a calendar application. With this information, the first speech processing system 120a may determine navigational information including an estimated trip duration, and send 340 output data to the device 110. In this example, the first speech processing system 120a can cause the device 110 to output the spoken message: "Leave at 11:30."

In the example dialog illustrated in FIG. 3, the speech processing systems 120 work together to resolve anaphora in the user's 5 speech. FIGS. 4 and 5, described below, illustrate two examples in which the system 100 fails to resolve anaphora due to prohibition by information sharing policies.

FIG. 4 is a signal flow diagram illustrating second example operations of the system 100, according to embodiments of the present disclosure. FIG. 4 illustrates an example in which the system 100 fails to resolve an anaphora due to an entity policy prohibiting certain information sharing. Accordingly, the system asks the user for the information. The user 5 may speak 401 a first utterance to the device 110. The first utterance may begin with a wakeword followed by a request: "Spotify, play music by Bob Dylan." The device 110, recognizing the wakeword for a music streaming service, may send 404 the audio data along with a dialog identifier dialog ID 01 to the second speech processing system 120b for processing. The second speech processing system 120b may return 406 output data accompanied by the dialog ID 01 to the device 110. The output data may include audio data representing the requested song. The output data may include rendered speech for output by the device 110. In this example, the output data may cause the device 110 to output a verbal message, "Okay, playing Bob Dylan," accompanied by streaming the song Tangled Up In Blue.

The user 5 may speak 409 a second utterance to the device 110. The second utterance may begin with a second wakeword corresponding to the first speech processing system 120a, followed by a second request: "Alexa, buy this album on vinyl." The device 110 may send 412 the audio data to the first speech processing system 120a along with a context token. The context token may include the dialog identifier dialog ID 01. In some implementations, the context token may include additional information such as an identifier corresponding to the second speech processing system 120b.

Upon receiving the audio data, the first speech processing system 120a may not be able to resolve an entity. In this case, the first speech processing system 120a may lack sufficient contextual information to resolve the phrase "this album" in the second utterance. The first speech processing system 120a may send 414 a request for information about the entity to the second speech processing system 120b. The request may include the dialog identifier dialog ID 01 that the first speech processing system 120a received with the audio data. In some implementations, the request may include additional information, such as a type entity the first speech processing system 120a is attempting to resolve. In this example, the first speech processing system 120a is seeking information regarding an entity of type album name. The second speech processing system 120b may receive the request and determine 416 whether it has authorization under applicable user permissions and/or entity information sharing policies to share the information requested by the first speech processing system 120a. FIG. 7, described further below, shows a flowchart illustrating example operations of a speech processing system 120 handling a request for information regarding an entity. In this example, the second speech processing system 120b determines that it lacks authorization to share the requested information. The second speech processing system 120b can return 418 a message to the first speech processing system 120a declining to respond to the request.

The first speech processing system 120a, unable to execute on the second utterance, may send 420 output data including a question to the device 110 to cause the device 110 to output: "What album are you looking for?" The user 5 may then provide 423 a third utterance naming the album to the device 110: "Blood on the Tracks." The device may send 426 the audio data and a second dialog identifier to the first speech processing system 120a. The first speech processing system 120a may order the album on behalf of the user 5, and send 428 output data to the device 110 to cause the device 110 to output: "Purchase confirmed."

In this example, even though the second speech processing system 120b lacked the authorization to share information regarding the user 5 request with the first speech processing system 120a, perhaps due to the competitive posture of the respective entities associated with the speech processing systems 120a, the first speech processing system 120a attempted to disambiguate the user's 5 request with the question output at step 420. Because the intent is in the shopping domain, which in this example lies within the purview of the first speech processing system 120a, the disambiguation may result in a better user experience than simply handing the request off to the second speech processing system 120b.

FIG. 5 is a signal flow diagram illustrating third example operations of the system 100, according to embodiments of the present disclosure. FIG. 5 illustrates another example in which the system 100 fails to resolve an anaphora due to an entity policy restricting information sharing by the first speech processing system 120a. The first speech processing system 120a can instead hand off the request to the second speech processing system 120b, which has information that can help respond to the user 5 request. The first speech processing system 120a can accomplish this by forwarding data representing audio data of the user request to the second speech processing system 120b, and notifying the user 5 of the handoff.

The user 5 may speak 501 a first utterance to the device 110. The first utterance may begin with a wakeword followed by a request: "Spotify, play music by Bob Dylan." The device 110, recognizing the wakeword for a music streaming service, may send 504 the audio data along with a dialog identifier dialog ID 01 to the second speech processing system 120b for processing. The second speech processing system 120b may return 506 output data accompanied by the dialog ID 01. The output data may include audio data representing the requested song. The output data may also include rendered speech for output by the device 110 such as "Okay, playing Bob Dylan," accompanied by streaming the song Tangled Up In Blue.

The user 5 may speak 509 a second utterance to the device 110. The second utterance may begin with a second wakeword corresponding to the first speech processing system 120a, followed by a second request: "Alexa, what year did this album come out?" The device 110 may send 512 the audio data to the first speech processing system 120a along with a context token. The context token may include the dialog identifier dialog ID 01. In some implementations, the context token may include additional information such as an entity identifier corresponding to the second speech processing system 120b.

Upon receiving the audio data, the first speech processing system 120a may not be able to resolve an entity referenced by the audio data. In this case, the first speech processing system 120a may lack sufficient contextual information to resolve the phrase "this album" in the second utterance. The first speech processing system 120a may send 514 a request to the second speech processing system 120b. The request may include the dialog identifier dialog ID 01 that the first speech processing system 120a received with the audio data. In some implementations, the request may include additional information, such as a type entity the first speech processing system 120a is attempting to resolve. In this example, the first speech processing system 120a is seeking to resolve an entity of type album name. The second speech processing system 120b may receive the request and determine 516 whether it has authorization under applicable user permissions and/or entity information sharing policies to share the information requested by the first speech processing system 120a. In this case, the second speech processing system 120b determines that it lacks authorization to share the requested information. The second speech processing system 120b may return 518 a message to the first speech processing system 120a declining to share information in response to the request.

The first speech processing system 120a, unable to execute on the second utterance, may determine 519 whether it has authorization under applicable user permissions and/or entity information sharing policies to share data related to the audio data with the second speech processing system 120b. Determining that it has authorization to share the data, the first speech processing system 120a send 520 output data to the device 110, which can cause the device 110 to output: "Spotify can help answer that." The first speech processing system 120a can then send 524 data representing the audio data of the second utterance to the second speech processing system 120b. The second speech processing system 120b can process the data and send 526 output data to the device 110 to cause the device 110 to output: "Blood on the Tracks was released in 1975. It is Bob Dylan's 15th studio album." Thus, although the second speech processing system 120b lacked the authorization to share information regarding the user 5 request with the first speech processing system 120a, the first speech processing system 120a had authorization to share audio data from the user 5 pertinent to a contemporaneous service being provided to the user 5 by the second speech processing system 120b, thus providing an enhanced user experience by facilitating an answer to the user's 5 question without need for further input from the user 5.

FIG. 6 is a flowchart illustrating example operations of a speech processing system 120 attempting to resolve an anaphora, according to embodiments of the present disclosure. The speech processing system 120 receives (602) audio data representing a user utterance. The speech processing system 120 may receive the audio data from the device 110. The speech processing system 120 may perform ASR and NLU processing on the audio data. The speech processing system 120 may attempt to resolve an entity mention represented in the audio data. If the entity mention is resolvable (yes at 604), the speech processing system 120 can resolve the entity mention to determine an entity, and provide (606) output data based on the entity back to the system 120. If the entity mention is not resolvable (no at 604) due to an anaphora represented in the audio data, the speech processing system 120 may send (608) a request to a second speech processing system. The request may include a context token received with the audio data at (602). The context token may refer to a previous utterance received by the system 120.

The speech processing system 120 may receive one of several possible responses depending on the implementation, and in some cases may receive no response at all. If the speech processing system 120 receives (yes at 610) a failure indicating that the other speech processing system could not answer the request, the speech processing system 120 may output (612) a response indicating a failure to parse the audio data. If the speech processing system 120 receives (yes at 614) a message indicating that the other speech processing system lacks the authority to respond due to a user permission setting and/or an information sharing policy restriction, the speech processing system 120 may output (616) a response indicating that it lacks context to successfully respond to the utterance. In some cases, the speech processing system 120 may handoff the user request to the other speech processing system.

In some cases, the speech processing system 120 may receive (yes at 618) data representing the second audio data corresponding to a previous utterance; for example, in the form of ASR output data. The other speech processing system may send the data if it cannot determine an entity corresponding to the request sent at (608), but permissions and policies allow it to share certain user data including data representing audio data. If the response from the other speech processing system includes data representing audio data, the speech processing system 120 can process (620) the data using NLU. If the speech processing system 120 can resolve the entity (yes at 622) using the audio data, the speech processing system 120 can provide (606) a response to the user. If the speech processing system 120 cannot resolve the entity (no at 622) using the audio data, the speech processing system 120 may output (624) an indication that it could not process the user input.

The speech processing system 120 may receive (626) from the other speech processing system an entity corresponding to the request sent at (608). The entity may be specified by an entity identifier. The entity identifier may correspond to an entity ontology. In some cases, the speech processing systems may use different entity ontologies. The speech processing system 120 may determine that the entity identifier is associated with an entity ontology other than the one used by the speech processing system 120 (no at 630). In such cases, the speech processing system 120 may translate (632) the entity identifier to determine an entity identifier associated with the speech processing system's 120 own entity ontology. The speech processing system 120 can complete the processing of the audio data with the translated entity identifier and provide (606) a response to the user. If the speech processing systems use the same entity ontology (yes at 630), the speech processing system 120 may complete processing of the entity identifier and the audio data without translation and provide (606) a response to the user.

If the speech processing system 120 receives no response from the other speech processing system (no at 626), processing of the utterance may fail and the speech processing system 120 may output (628) a response indicating that it could not process the user input.

FIG. 7 is a flowchart illustrating example operations of a speech processing system 120 handling a request to provide information related to an anaphora, according to embodiments of the present disclosure. The speech processing system 120 can receive (704) a request from another speech processing system to provide entity information in response to a context token. The speech processing system 120 can determine whether or not it is authorized to share information in response to the request based on user permissions and/or entity information sharing policies. If the speech processing system 120 determines that it is not authorized to share information with the other speech processing system based on an entity information sharing policy (no at 706), the speech processing system 120 may respond (708) with an indication that it is not authorized to share information in response to the request. If the speech processing system 120 determines that it has authorization to share information with the other speech processing system based on the entity information sharing policy (yes at 706), the speech processing system 120 may proceed with determining whether user permission settings allow information sharing. If the speech processing system 120 determines that user permission settings do not allow information sharing (no at 710), the speech processing system 120 may issue a response (712) that it is not permitted to respond to the request. If the speech processing system 120 determines that the user permissions allow information sharing (yes at 710), the speech processing system 120 may attempt to resolve the token in the request. If the speech processing system 120 is able to resolve the request (yes at 714), the speech processing system 120 may respond (720) with an entity identifier. If the speech processing system 120 is unable to resolve the request (no at 714), the speech processing system 120 may determine whether it user permission settings allow it to share audio data representing a previous utterance by the user. If the user permissions allow the sharing of audio data (yes at 716), the speech processing system 120 may respond (718) to the request with data representing the audio data; for example, ASR output data. If the user permissions do not allow the sharing of audio data (no at 716), the speech processing system 120 may respond (712) that it is not permitted to respond to the request.

As noted above, the teachings herein (for example as relating to FIGS. 1 and 3-7) related to exchanging data between cloud/remote based speech processing systems 120 (e.g., 120a, 120b, etc.) may also apply to exchanging data between local speech processing systems 291 (e.g., 291a, 291b, etc.). For example, if a user has an exchange with a first local speech processing system 291a and then speaks an utterance invoking a second local speech processing system 291b, data may be requested/exchanged between the first local speech processing system 291a and the second local speech processing system 291b using techniques described herein. In another example, if a user has an exchange with a first remote speech processing system 120a and then speaks an utterance invoking a second local speech processing system 291b, data may be requested/exchanged between the first remote speech processing system 120a and the second local speech processing system 291b.

The teachings may also apply between local/remote/ hybrid speech processing systems. For example, if a user has an exchange with a first speech processing system 120a and then speaks an utterance invoking a second, hybrid speech processing system 120b/291b, data may be requested/exchanged between the first speech processing system 120a and both the second remote speech processing system 120b and the second local speech processing system 291b using techniques described herein.

Figure 8:
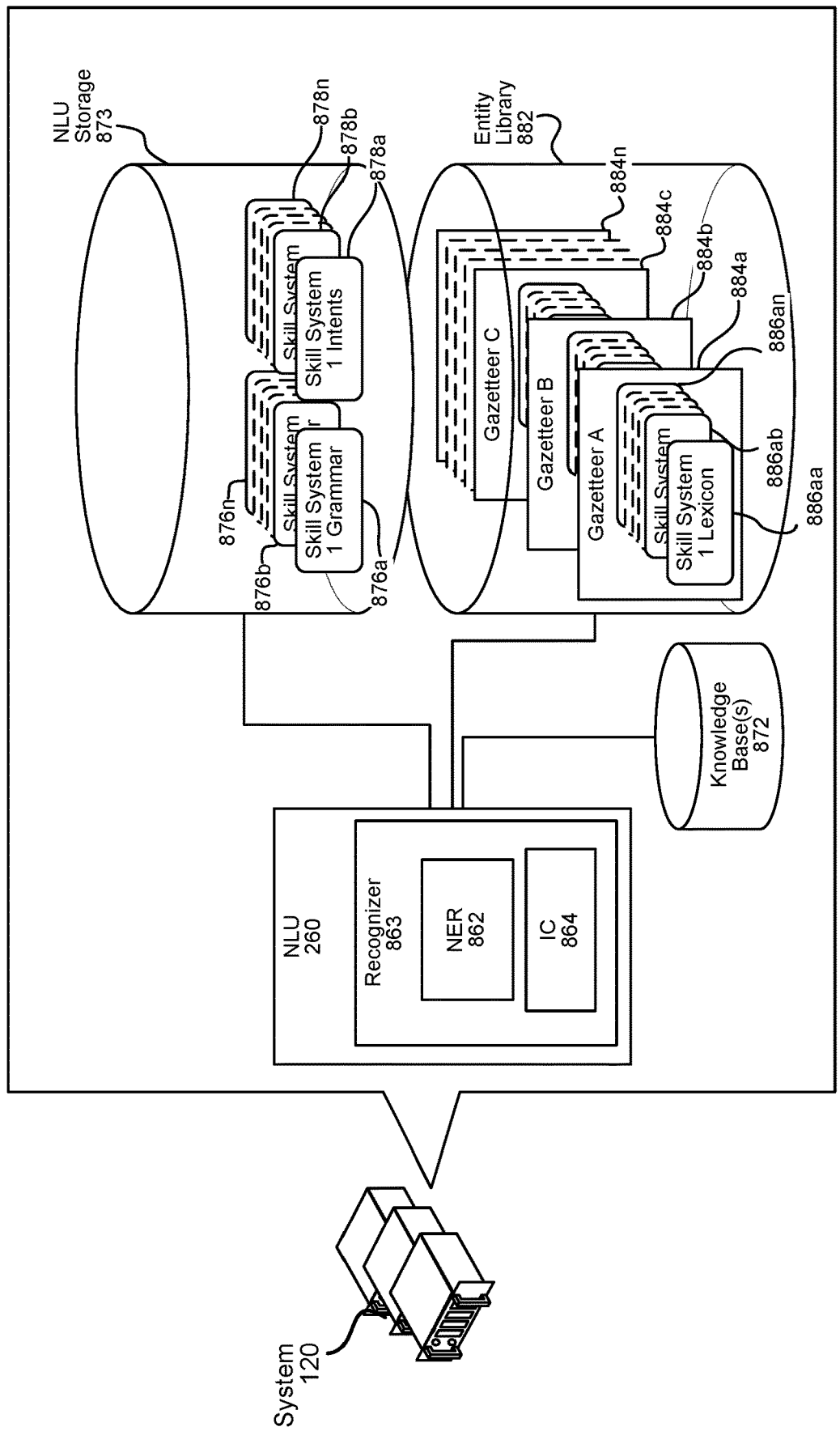
FIG. 8 is a conceptual diagram of how natural language processing is performed, according to embodiments of the present disclosure.
Figure 9:
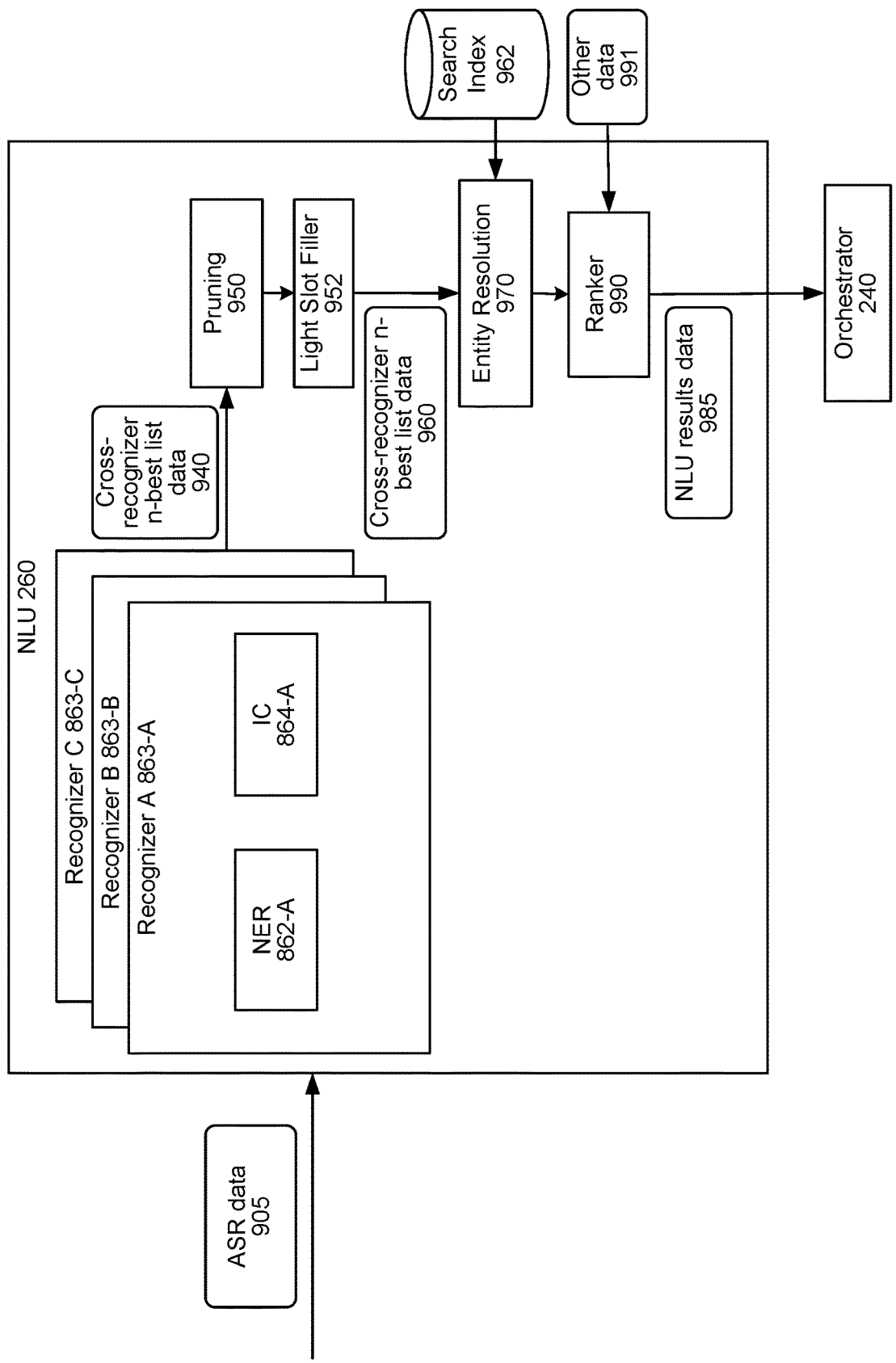
FIG. 9 is a conceptual diagram of how natural language processing is performed, according to embodiments of the present disclosure.

FIGS. 8 and 9 illustrates how the NLU component 260 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure. The NLU components/operations described may be similar and/or shared across speech processing systems 120 and/or NLU components/operations may be different across speech processing systems 120. For example, as noted above certain recognizable entities and entity ontologies (for example those used by search index 962) may differ (or be shared), recognizable intents may differ (or be shared), etc. The NLU component may process ASR data 905 received from the ASR component 250. The NLU component 260 may include one or more recognizers 863. In at least some embodiments, a recognizer 863 may be associated with a skill system 125 (e.g., the recognizer may be configured to interpret text data to correspond to the skill system 125). In at least some other examples, a recognizer 863 may be associated with a domain (e.g., the recognizer may be configured to interpret text data to correspond to the domain).

Recognizers 863 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 260 may communicate with various storages. The NLU component 260 may communicate with an NLU storage 873, which includes skill system grammars (876a-876n), representing how natural language inputs may be formulated to invoke skill systems 125, and skill system intents (878a-878n) representing intents supported by respective skill systems 125.

Each recognizer 863 may be associated with a particular grammar 876, a particular intent(s) 878, and a particular personalized lexicon 886 (stored in an entity library 882). A gazetteer 884 may include skill system-indexed lexical information associated with a particular user. For example, Gazetteer A (884a) may include skill system-indexed lexical information 886aa to 886an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 863 may include a NER component 862 that attempts to identify grammars and lexical information that may be used to construe meaning with respect to text data input therein. A NER component 862 identifies portions of text data that correspond to a named entity that may be recognizable by the system 120. A NER component 862 may also determine whether a word refers to an entity that is not explicitly mentioned in the text, for example "him," "her," "it" or other anaphora, exophora or the like.

A NER component 862 applies grammar models 876 and lexical information 886 associated with one or more skill systems 125 to determine a mention of one or more entities in text data input therein. In this manner, a NER component 862 identifies "slots" (i.e., particular words in text data) that may be needed for later processing. A NER component 862 may also label each slot with a type (e.g., noun, place, city, artist name, song name, etc.).

Each grammar model 876 may include the names of entities (i.e., nouns) commonly found in speech about a particular skill system 125 to which the grammar model 876 relates, whereas lexical information 886 may be personalized to the user identifier output by a user recognition component 295 for the natural language input. For example, a grammar model 876 associated with a shopping skill system may include a database of words commonly used when people discuss shopping.

A downstream process called named entity resolution actually links a portion of text data (identified by a NER component 862) to a specific entity known to the system 120. To perform named entity resolution, the NLU component 260 may use gazetteer information (884a-884n) stored in the entity library storage 882. The gazetteer information 884 may be used to match text data (identified by a NER component 862) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 863 may also include an IC component 864 that processes text data input thereto to determine an intent(s) of a skill system(s) 125 that potentially corresponds to the natural language input represented in the text data. An intent corresponds to an action to be performed that is responsive to the natural language input represented by the text data. An IC component 864 may communicate with a database 878 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 878 associated with the skill system(s) 125 that is associated with the recognizer 863 implementing the IC component 864.

The intents identifiable by a specific IC component 864 may be linked to one or more skill system-specific grammar frameworks 876 with "slots" to be filled. Each slot of a grammar framework 1076 corresponds to a portion of text data that a NER component 862 believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 876 may not be structured as sentences, but rather based on associating slots with grammatical tags.

For example, a NER component 862 may identify words in text data as subject, object, verb, preposition, etc. based on grammar rules and/or models prior to recognizing named entities in the text data. An IC component 864 (implemented by the same recognizer 863) may use the identified verb to identify an intent. The NER component 862 may then determine a grammar model 876 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in the text data the NER component 862 previously tagged as a grammatical object or object modifier with those identified in the lexicon 886.

A NER component 862 may perform semantic tagging, which is the labeling of a word or combination of words according to their type/semantic meaning. A NER component 862 may parse text data using heuristic grammar rules, or a model may be constructed using techniques such as hidden Markov models, maximum entropy models, log linear models, conditional random fields (CRF), and the like. For example, a NER component 862, implemented by a music skill system or music domain recognizer 863, may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 may identify "Play" as a verb based on a word database associated with the music skill system or music domain, which an IC component 864 may determine corresponds to a <PlayMusic> intent. At this stage, no determination has been made as to the meaning of "mother's little helper" and "the rolling stones," but based on grammar rules and models, the NER component 862 has determined that the text of these phrases relates to the grammatical object (i.e., entity).

The frameworks linked to the intent are then used to determine what database fields should be searched to determine the meaning of these phrases, such as searching a user's gazetteer 884 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 884 does not resolve a slot/field using gazetteer information, the NER component 862 may search a database of generic words (in the knowledge base 872). For example, if the text data corresponds to "play songs by the rolling stones," after failing to determine an album name or song name called "songs" by "the rolling stones," the NER component 862 may search a music skill system vocabulary for the word "songs." In the alternative, generic words may be checked before the gazetteer information, or both may be tried, potentially producing two different results.

A recognizer 863 may tag text data to attribute meaning thereto. For example, a recognizer 863 may tag "play mother's little helper by the rolling stones" as: {skill system} Music, {intent} Play Music, {artist name} rolling stones, {media type} SONG, and {song title} mother's little helper. For further example, a recognizer 863 may tag "play songs by the rolling stones" as: {skill system} Music, {intent} Play Music, {artist name} rolling stones, and {media type} SONG.

As described above, more than one recognizer 863 may process with respect to text data representing a single natural language input. In such instances, each recognizer 863 may output NLU hypothesis data including at least one NLU hypothesis including an intent indicator (determined by an IC component 864 of the recognizer 863) and at least one tagged named entity (determined by a NER component 862 of the recognizer 863).

The NLU component 260 may compile the NLU hypotheses (output by multiple recognizers 863) into cross-recognizer N-best list data 940. Each NLU hypothesis may be associated with a respective score indicating a likelihood that the NLU hypothesis corresponds to the domain, one or more skill systems 125, etc. associated with the recognizer 863 from which the NLU hypothesis was output. For example, the cross-recognizer N-best list data 940 may be represented as:

[0.95] Intent: <PlayMusic> ArtistName: Lady Gaga SongName: Poker Face
[0.70] Intent: <PlayVideo> ArtistName: Lady Gaga VideoName: Poker Face
[0.01] Intent: <PlayMusic> ArtistName: Lady Gaga AlbumName: Poker Face
[0.01] Intent: <PlayMusic> SongName: Pokerface with each line of the foregoing corresponding to a different NLU hypothesis and associated score.

The NLU component 260 may send the cross-recognizer N-best list data 940 to a pruning component 950, which sorts the NLU hypotheses, represented in the cross-recognizer N-best list data 940, according to their respective scores. The pruning component 950 may then perform score thresholding with respect to the cross-recognizer N-best list data 940. For example, the pruning component 950 may select NLU hypotheses, represented in the cross-recognizer N-best list data 940, associated with scores satisfying (e.g., meeting and/or exceeding) a threshold score. The pruning component 950 may additionally or alternatively perform number of NLU hypothesis thresholding. For example, the pruning component 950 may select a threshold number of top-scoring NLU hypotheses represented in the cross-recognizer N-best list data 940.

The pruning component 950 may generate cross-recognizer N-best list data 960 including the selected NLU hypotheses. The purpose of the pruning component 950 is to create a reduced list of NLU hypotheses so that downstream, more resource intensive, processes may only operate on NLU hypotheses that most likely represent the natural language input.

The NLU component 260 may include a light slot filler component 952 that takes text from slots, represented in the NLU hypotheses output by the pruning component 950, and alter it to make the text more easily processed by downstream components. The light slot filler component 952 may perform low latency operations that do not involve heavy operations such as reference to a knowledge base. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-recognizer N-best list data 960.

The cross-recognizer N-best list data 960 may be sent to an entity resolution component 970. The entity resolution component 970 can apply rules or other instructions to standardize labels or tokens in the NLU hypotheses represented in the cross-recognizer N-best list data 960. The precise transformation may depend on the skill system 125, domain, etc. to which a NLU hypothesis relates. For example, for a travel skill system-specific NLU hypothesis, the entity resolution component 970 may transform text corresponding to "Boston airport" to the standard BOS three-letter code referring to the airport. The entity resolution component 970 can refer to a knowledge base that is used to specifically identify the precise entity referred to in each slot of each NLU hypothesis represented in the cross-recognizer N-best list data 960.

Specific intent/slot combinations may also be tied to a particular source, which may then be used to resolve the text. In the example "play songs by the stones," the entity resolution component 970 may reference a personal music catalog, Amazon Music account, a user profile, or the like with entity data that the entity resolution component 970 can leverage to identify entities corresponding to slots or entity mentions in the cross-recognizer N-best list data 960. The entity resolution component 970 may refer to one or more search indices 962. The search index 962 may be a data structure including one or more lists, tables, catalogs, etc. The search index 962 may be organized according to a particular schema or entity ontology. The entity resolution component 970 may output N-best list data, altered from the cross-recognizer N-best list data 960, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 970 that are each specific to one or more different skill systems 125, domains, etc.

In some cases, the entity resolution component 970 may fail to resolve an entity mention due to anaphora or other missing context. When this occurs, the entity resolution component 970 can initiate a request for information from another speech processing system as described herein. In some cases a response to the request may include audio data that may be processed with ASR and NLU to determine entity data. In some cases a response to the request can include an entity identifier associated with a different entity ontology, and the entity resolution component 970 or some other component of the system may translate the entity identifier into the particular entity ontology used by the entity resolution component 970.

The NLU component 260 may include a ranker component 990 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 990 may assign the first NLU hypothesis a higher score than a second NLU hypothesis including at least one slot that is unfilled/unresolved by the entity resolution component 970.

The ranker component 990 may apply re-scoring, biasing, or other techniques. To do so, the ranker component 990 may consider not only the data output by the entity resolution component 970, but may also consider other data 991. The other data 991 may include a variety of information.

For example, the other data 991 may include skill system 125 rating or popularity data. For example, if a skill system 125 has a high rating, the ranker component 990 may increase the score of a NLU hypothesis associated with that skill system 125, and vice versa.

The other data 991 may additionally or alternatively include information about skill systems 125 that have been enabled by the user that originated the natural language input. For example, the ranker component 990 may assign higher scores to NLU hypotheses associated with enabled skill systems 125 than NLU hypotheses associated with skill systems 125 that have not been enabled by the user.

The other data 991 may additionally or alternatively include data indicating system usage history (e.g., specific to the user), such as if the user, that originated the natural language input, regularly invokes a particular skill system 125 or does so at particular times of day. The other data 991 may additionally or alternatively include data indicating date, time, location, weather, type of device 110, user identifier, context, as well as other information. For example, the ranker component 990 may consider when any particular skill system 125 is currently active with respect to the present user and/or device 110 (e.g., music being output by the skill system 125, a game being executed by the skill system 125, etc.).

The ranker component 990 may output NLU results data 985 including one or more NLU hypotheses. The NLU component 260 may send the NLU results data 985 to the orchestrator component 240.

As described above, the system 120 may perform speech processing using two different components (e.g., the ASR component 250 and the NLU component 260). One skilled in the art will appreciate that the system 120, in at least some embodiments, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs NLU hypothesis data including a most likely NLU hypothesis, or multiple NLU hypotheses in the form of a lattice or an N-best list with individual NLU hypotheses corresponding to confidence scores or other scores (such as probability scores, etc.).

As described above, the system 120 may include a user recognition component 295. The user recognition component 295 may recognize one or more users using a variety of data. User recognition data can be helpful, for example, determining user permission for information sharing between respective speech processing systems for resolving anaphora and missing context in a user's request. In some cases, a first user may consent to limited information sharing between different speech processing systems for the purpose of an improved user experience. A second user may dictate that speech processing systems not share his or her information with other speech processing systems.

Figure 10:
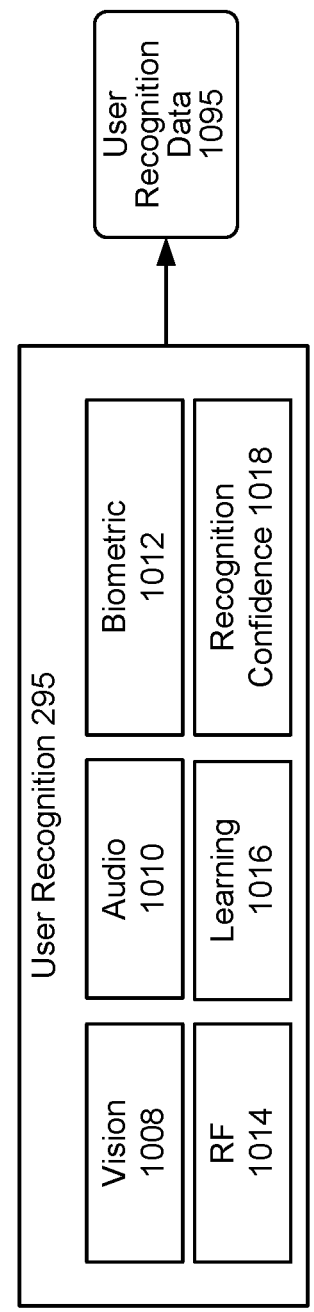
FIG. 10 is a schematic diagram of an illustrative architecture in which sensor data is combined to recognize one or more users, in accordance with embodiments of the present disclosure.

As illustrated in FIG. 10, the user recognition component 295 may include one or more subcomponents including a vision component 1008, an audio component 1010, a biometric component 1012, a radio frequency (RF) component 1014, a learning component 1016, and a recognition confidence component 1018. In some instances, the user recognition component 295 may monitor data and determinations from one or more subcomponents to recognize an identity of one or more users associated with data input to the system 120. The user recognition component 295 may output user recognition data 1095, which may include a user identifier associated with a user the user recognition component 295 believes originated data input to the system 120. The user recognition component 295 may be used to inform processes performed by various components of the system 120 as described herein.

The vision component 1008 may receive data from one or more sensors capable of providing images (e.g., cameras) or sensors indicating motion (e.g., motion sensors). The vision component 1008 can perform facial recognition or image analysis to determine an identity of a user and to associate that identity with a user profile associated with the user. In some instances, when a user is facing a camera, the vision component 1008 may perform facial recognition and identify the user with a high degree of confidence. In other instances, the vision component 1008 may have a low degree of confidence of an identity of a user, and the user recognition component 295 may use determinations from additional components to determine an identity of a user. The vision component 1008 can be used in conjunction with other components to determine an identity of a user. For example, the user recognition component 295 may use data from the vision component 1008 with data from the audio component 1010 to identify what user's face appears to be speaking at the same time audio is received by a device 110 the user is facing for purposes of identifying a user who spoke an input to the system 120.

The overall system of the present disclosure may include biometric sensors that transmit data to the biometric component 1012. For example, the biometric component 1012 may receive data corresponding to fingerprints, iris or retina scans, thermal scans, weights of users, a size of a user, pressure (e.g., within floor sensors), etc., and may determine a biometric profile corresponding to a user. The biometric component 1012 may distinguish between a user and sound from a television, for example. Thus, the biometric component 1012 may incorporate biometric information into a confidence level for determining an identity of a user. Biometric information output by the biometric component 1012 can be associated with specific user profile data such that the biometric information uniquely identifies a user profile of a user.

The RF component 1014 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1014 the strength of the signal (e.g., as a received signal strength indication (RSSI)). The RF component 1014 may use the RSSI to determine an identity of a user (with an associated confidence level). In some instances, the RF component 1014 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the system 120 for purposes of the system 120 determining who spoke a particular input. Such a registration may occur prior to, during, or after speaking of an input.

The learning component 1016 may track the behavior of various users as a factor in determining a confidence level of the identity of the user. By way of example, a user may adhere to a regular schedule such that the user is at a first location during the day (e.g., at work or at school). In this example, the learning component 1016 would factor in past behavior and/or trends in determining the identity of the user that provided input to the system 120. Thus, the learning component 1016 may use historical data and/or usage patterns over time to increase or decrease a confidence level of an identity of a user.

In at least some instances, the recognition confidence component 1018 receives determinations from the various components 1008, 1010, 1012, 1014, and 1016, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1095.

The audio component 1010 may receive data from one or more sensors capable of providing an audio signal (e.g., one or more microphones) to facilitate recognition of a user. The audio component 1010 may perform audio recognition on an audio signal to determine an identity of the user and associated user identifier. In some instances, aspects of the system 120 may be configured at a computing device (e.g., a local server). Thus, in some instances, the audio component 1010 operating on a computing device may analyze all sound to facilitate recognition of a user. In some instances, the audio component 1010 may perform voice recognition to determine an identity of a user.

The audio component 1010 may also perform user identification based on audio data 211 input into the system 120 for speech processing. The audio component 1010 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1010 may perform user recognition by comparing speech characteristics represented in the audio data 211 to stored speech characteristics of users (e.g., stored voice profiles associated with the device 110 that received the spoken user input).

Figure 11:
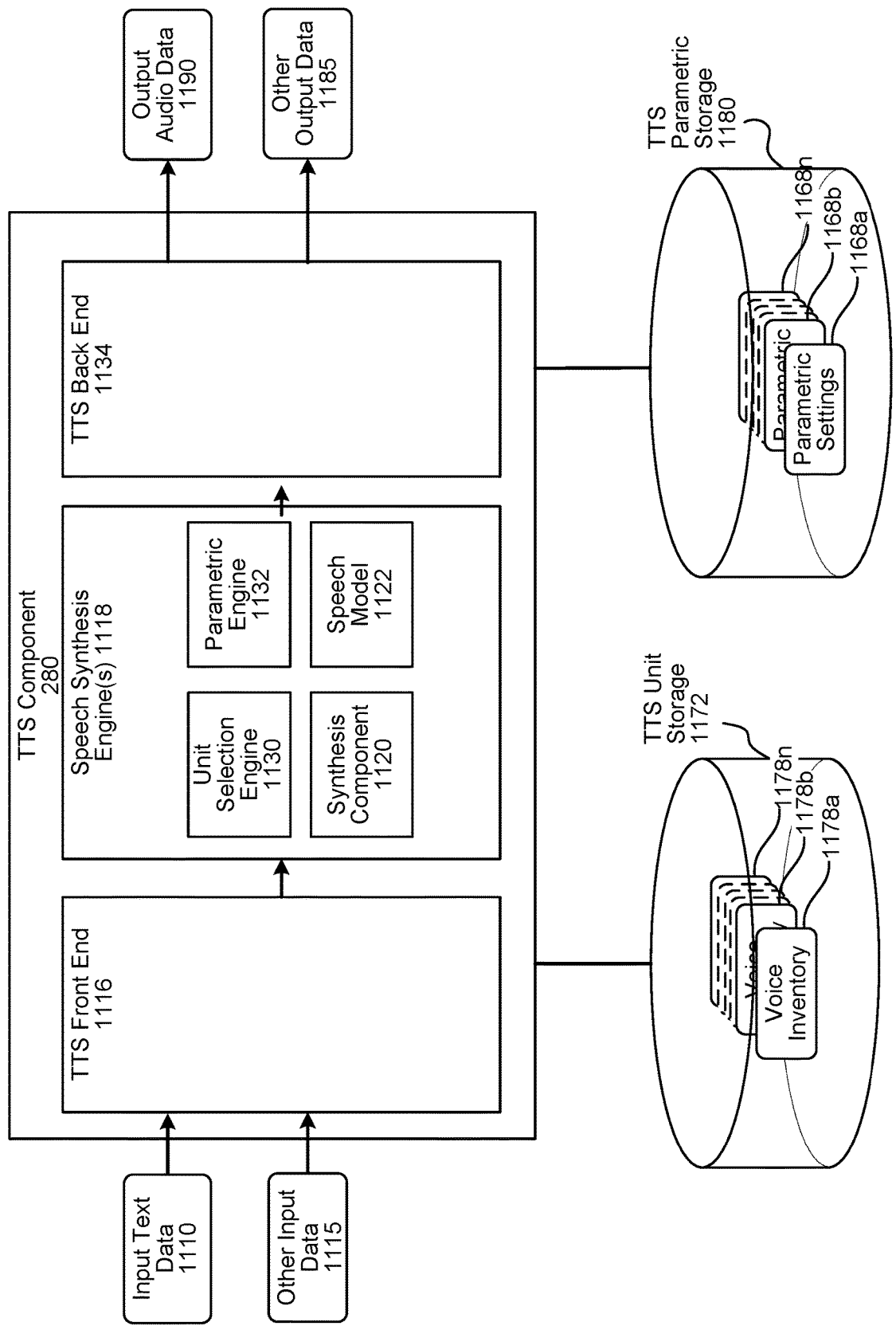
FIG. 11 is a conceptual diagram of text-to-speech components according to embodiments of the present disclosure.

Components of a system that may be used to perform unit selection, parametric TTS processing, and/or model-based audio synthesis are shown in FIG. 11. In some implementations, each speech processing system 120 may include a TTS component 280 having a unique voice so as to tall allow a user to identify the particular speech processing system 120 with which he or she is interacting. As shown in FIG. 11, the TTS component 280 may include a TTS front end 1116, a speech synthesis engine 1118, TTS unit storage 1172, TTS parametric storage 1180, and a TTS back end 1134. The TTS unit storage 1172 may include, among other things, voice inventories 1178a-288n that may include pre-recorded audio segments (called units) to be used by the unit selection engine 1130 when performing unit selection synthesis as described below. The TTS parametric storage 1180 may include, among other things, parametric settings 1168a-268n that may be used by the parametric synthesis engine 1132 when performing parametric synthesis as described below. A particular set of parametric settings 1168 may correspond to a particular voice profile (e.g., whispered speech, excited speech, etc.).

In various embodiments of the present disclosure, model-based synthesis of audio data may be performed using by a speech model 1122 and a TTS front end 1116. The TTS front end 1116 may be the same as front ends used in traditional unit selection or parametric systems. In other embodiments, some or all of the components of the TTS front end 1116 are based on other trained models. The present disclosure is not, however, limited to any particular type of TTS front end 1116. The speech model 1122 may be used to synthesize speech without requiring the TTS unit storage 1172 or the TTS parametric storage 1180, as described in greater detail below.

The TTS front end 1116 transforms input text data 1110 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 1118. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 1110, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1116 may also process other input data 1115, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 1110 and/or the text for a TTS request may be accompanied by separate metadata indicating what text should be whispered (or have some other indicated audio characteristic). The speech synthesis engine 1118 may compare the annotated phonetic units models and information stored in the TTS unit storage 1172 and/or TTS parametric storage 1180 for converting the input text into speech. The TTS front end 1116 and speech synthesis engine 1118 may include their own controller(s)/processor(s) and memory or they may use the controller/processor and memory of the server 120, device 110, or other device, for example. Similarly, the instructions for operating the TTS front end 1116 and speech synthesis engine 1118 may be located within the TTS component 280, within the memory and/or storage of the server 120, device 110, or within an external device.

Text data 1110 input into the TTS component 280 may be sent to the TTS front end 1116 for processing. The front-end may include components for performing text normalization, linguistic analysis, linguistic prosody generation, or other such components. During text normalization, the TTS front end 1116 may first process the text input and generate standard text, converting such things as numbers, abbreviations (such as Apt., St., etc.), symbols ($, %, etc.) into the equivalent of written out words.

During linguistic analysis, the TTS front end 1116 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1172. The linguistic analysis performed by the TTS front end 1116 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1116 may then perform linguistic prosody generation where the phonetic units are annotated with desired prosodic characteristics, also called acoustic features, which indicate how the desired phonetic units are to be pronounced in the eventual output speech. During this stage the TTS front end 1116 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1116, which may be referred to as a symbolic linguistic representation, may include a sequence of phonetic units annotated with prosodic characteristics. This symbolic linguistic representation may be sent to the speech synthesis engine 1118, which may also be known as a synthesizer, for conversion into an audio waveform of speech for output to an audio output device and eventually to a user. The speech synthesis engine 1118 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1118 may perform speech synthesis using one or more different methods. In one method of synthesis called unit selection, described further below, a unit selection engine 1130 matches the symbolic linguistic representation created by the TTS front end 1116 against a database of recorded speech, such as a database (e.g., TTS unit storage 1172) storing information regarding one or more voice corpuses (e.g., voice inventories 1178*a-n*). Each voice inventory may correspond to various segments of audio that was recorded by a speaking human, such as a voice actor, where the segments are stored in an individual inventory 1178 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1130 may then use the information about each unit to select units to be joined together to form the speech output.

The unit selection engine 1130 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1120) to form output audio data 1190 representing synthesized speech. Using all the information in the unit database, a unit selection engine 1130 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1132, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1120) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS parametric storage 1180 based on feedback of the results of TTS processing, thus enabling the TTS component 280 to improve speech recognition.

The TTS parametric storage 1180 may be customized for an individual user based on his/her individualized desired speech output. In particular, the speech unit stored in a unit database may be taken from input audio data of the user speaking. For example, to create the customized speech output of the system, the system may be configured with multiple voice inventories 1178*a*-2118*n*, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on.

To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1178 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1168) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1130 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1130. As part of unit selection, the unit selection engine 1130 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1172 or in another storage component. For example, different unit selection databases may be stored in TTS unit storage 1172. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1118 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1132 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1116.

The parametric synthesis engine 1132 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1118, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1132 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1132 may lead to a number of potential audio output sequences. Based on the acoustic model and other potential models, the potential audio output sequences may be scored according to a confidence level of the parametric synthesis engine 1132. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1168, which may represent acoustic settings matching a particular parametric "voice", may be used by the speech model 1122 to ultimately create the output audio data 1190.

When performing unit selection, after a unit is selected by the unit selection engine 1130, the audio data corresponding to the unit may be passed to the synthesis component 1120. The synthesis component 1120 may then process the audio data of the unit to create modified audio data where the modified audio data reflects a desired audio quality. The synthesis component 1120 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 280. For each unit that corresponds to the selected portion, the synthesis component 1120 may process the audio data for that unit to create a modified unit audio data. The modified unit audio data may then be concatenated to form the output audio data 1190. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 280. In that case, other output data 1185 may be output along with the output audio data 1190 so that an ultimate playback device (e.g., device 110) receives instructions for playback that can assist in creating the desired output audio. Thus, the other output data 1185 may include instructions or other data indicating playback device settings (such as volume, playback rate, etc.) or other data indicating how output audio data including synthesized speech should be output. For example, for whispered speech, the output audio data 1190 may include other output data 1185 that may include a prosody tag or other indicator that instructs the device 110 to slow down the playback of the output audio data 1190, thus making the ultimate audio sound more like whispered speech, which is typically slower than normal speech. In another example, the other output data 1185 may include a volume tag that instructs the device 110 to output the speech at a volume level less than a current volume setting of the device 110, thus improving the quiet whisper effect.

Figure 12:
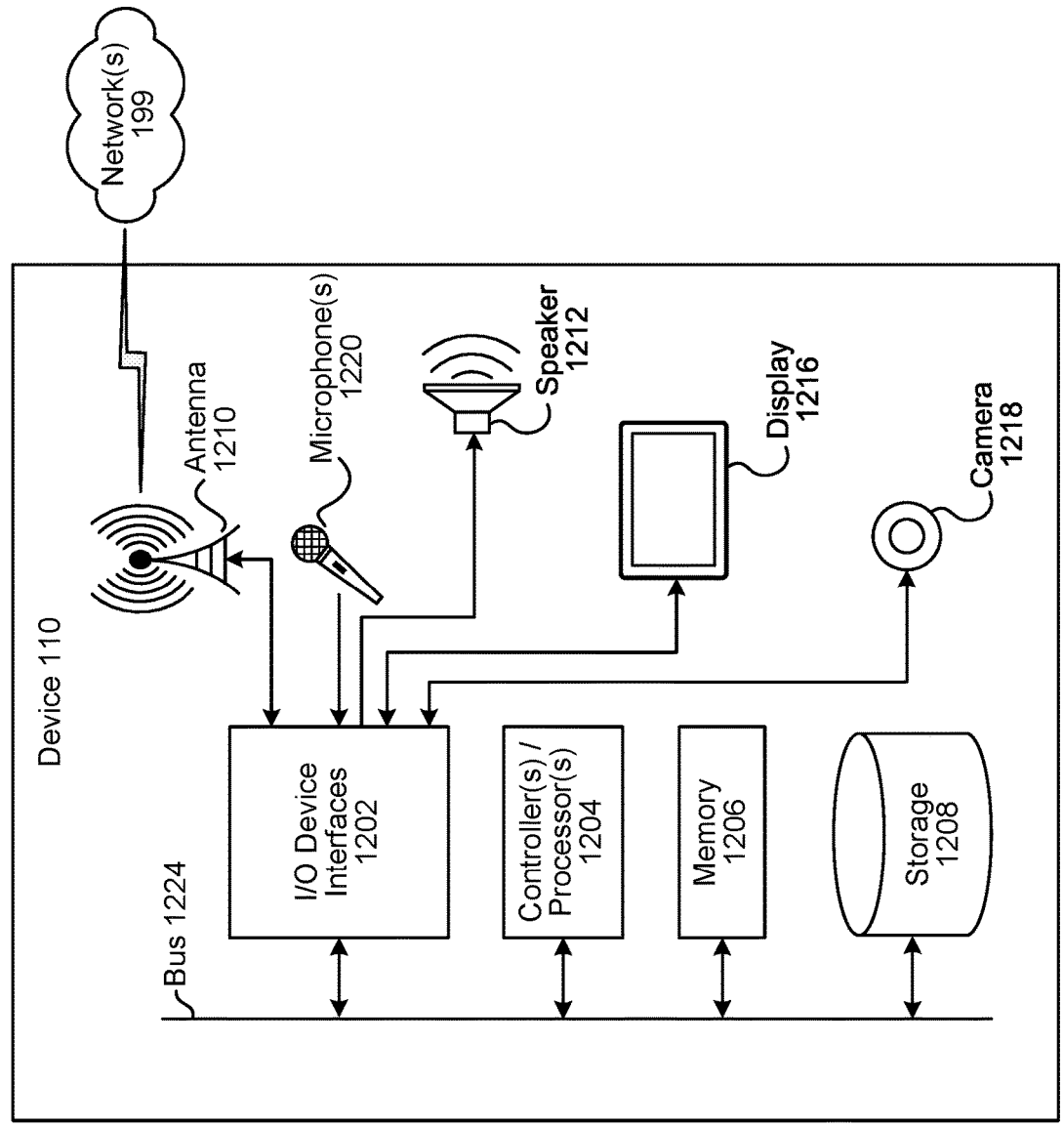
FIG. 12 is a block diagram conceptually illustrating example components of a device, according to embodiments of the present disclosure.
Figure 13:
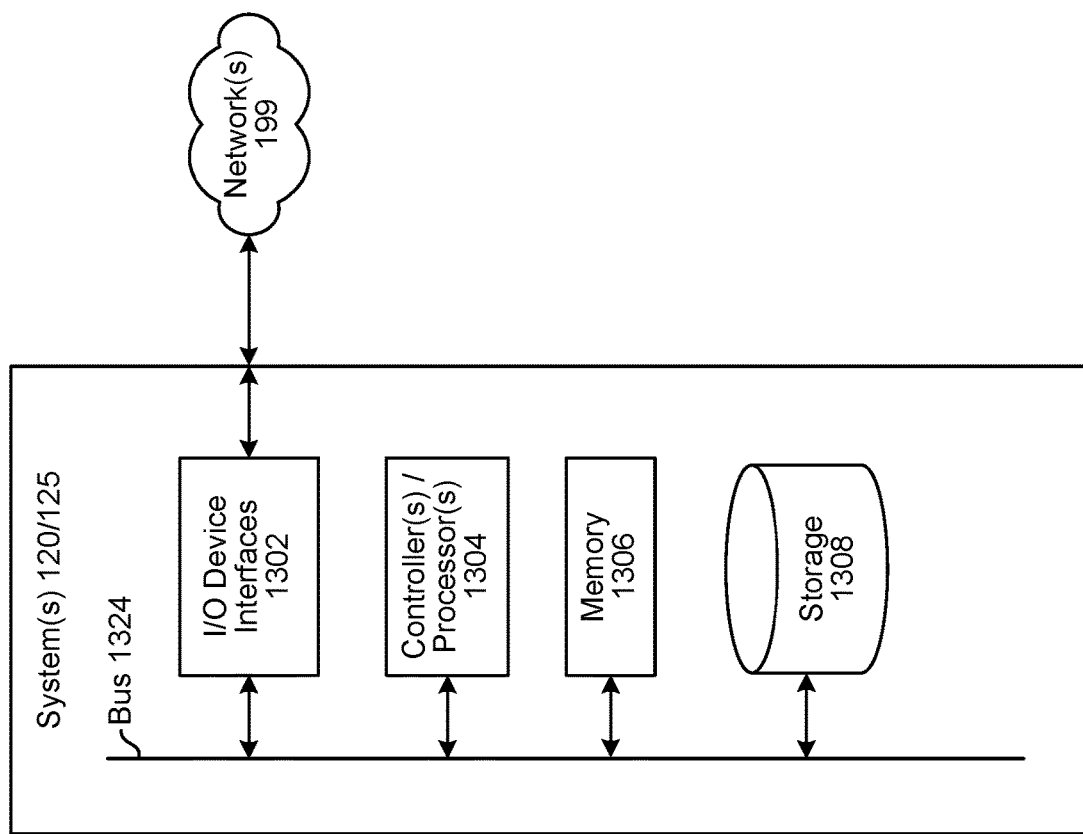
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language command processing systems 120 for performing ASR processing, one or more natural language command processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio receiving component. The audio receiving component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds received by different microphones of the array. The device 110 may additionally include a display 1216 for displaying content. The device 110 may further include a camera 1218.

Via antenna(s) 1210, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1202/1302), processor(s) (1204/1304), memory (1206/1306), and/or storage (1208/1308) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 14:
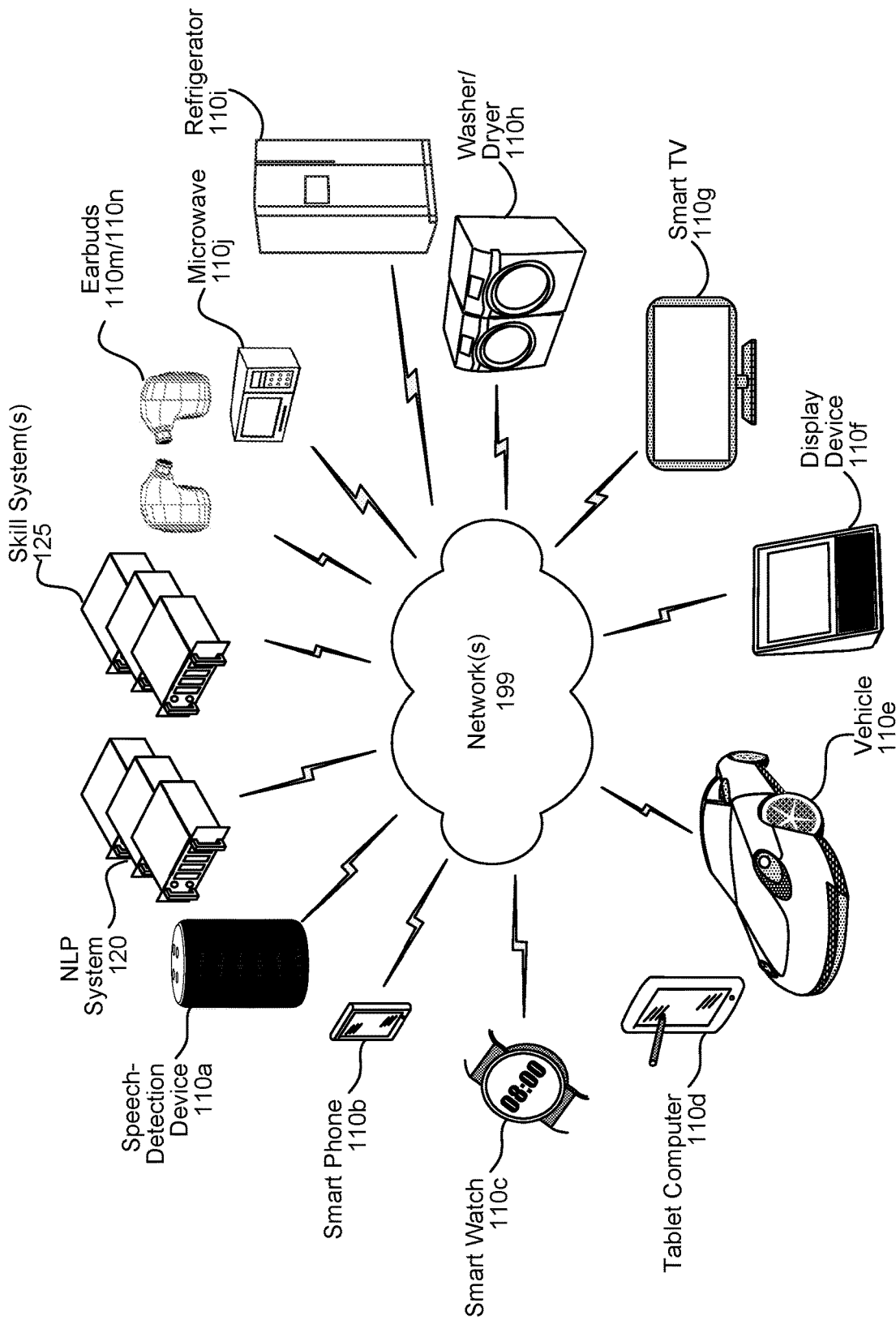
FIG. 14 illustrates an example of a computer network for use with the overall system, according to embodiments of the present disclosure.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone/tablet 110b, a smart watch 110c, a tablet computer 110d, a vehicle 110e, a display device 110f, a smart television 110g, a washer/dryer 110h, a refrigerator 110i, a microwave 110j, and/or earbuds 110m/110n may be connected to the network(s) 199 through a wireless service provider, over a Wi-Fi network, Bluetooth network, or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may receive audio using one-or-more built-in or connected microphones or other audio receiving devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, by a first speech processing system, first audio data representing a first utterance received by a first device, the first utterance corresponding to a first wakeword associated with the first speech processing system;
    determining a first dialog identifier that identifies at least one communication between the first device and the first speech processing system, the at least one communication corresponding to the first audio data;
    sending, from the first speech processing system to the first device in response to the first audio data, first output data for output by the first device, the first output data being based at least in part on first data representing a first entity corresponding to the first audio data;
    receiving, by a second speech processing system different from the first speech processing system, second audio data representing a second utterance received by the first device, the second utterance corresponding to a second wakeword different from the first wakeword and associated with the second speech processing system;
    receiving, by the second speech processing system, the first dialog identifier and an identifier of the first speech processing system;
    determining, by the second speech processing system, that the second audio data references a second entity;
    sending, by the second speech processing system to the first speech processing system, a request for information about the second entity, the request including the first dialog identifier;
    based at least in part on the first dialog identifier, determining, by the first speech processing system, first response data representing the first data;
    sending, by the first speech processing system to the second speech processing system in response to the request, the first response data;
    generating, by the second speech processing system, second output data based at least on the second audio data and the first response data; and
    sending, by the second speech processing system to the first device in response to the second audio data, the second output data for output by the first device.

2. The computer-implemented method of claim 1, further comprising:
    failing to identify, by the second speech processing system, the second entity based on the second audio data; and
    determining, by the first speech processing system, an entity identifier corresponding to the first dialog identifier, wherein:
        sending the first response data includes sending the entity identifier, and
        generating the second output data is additionally based on the entity identifier.

3. A computer-implemented method, comprising:
    receiving, at a first system and from a first device via a network, first audio data representing a first utterance detected by the first device;
    receiving, at the first system and from the first device via the network, a first dialog identifier that identifies at least one prior communication between the first device and a second system different from the first system, the at least one prior communication corresponding to second audio data representing a second utterance detected by the first device prior to detecting the first utterance;
    determining, by the first system, that the first audio data is associated with a first entity;
    sending, from the first system to the second system via the network, a first request for information about the first entity, the first request including the first dialog identifier;
    receiving, by the first system from the second system via the network, first data responsive to the first request, the first data including a representation of a second entity corresponding to the second audio data;
    processing, by the first system, the first data and the first audio data to determine second data responsive to the first utterance; and
    outputting a first response representing the second data.

4. The computer-implemented method of claim 3, further comprising:
    failing to resolve, by the first system, the first entity based on the first audio data,
    wherein sending the first request is subject to the failing to resolve.

5. The computer-implemented method of claim 3, further comprising:
    receiving, at the first system and from the first device, third audio data representing a third utterance detected by the first device;
    receiving, at the first system, a second dialog identifier that identifies at least one second communication between the first device and the second system, the at least one second communication corresponding to fourth audio data representing a fourth utterance detected by the first device prior to detecting the third utterance;
    determining that the third audio data is associated with a third entity;
    sending, from the first system to the second system, a second request for information about the third entity, the second request including the second dialog identifier;
    receiving, by the first system from the second system, third data responsive to the second request, the third data indicating that the second system declines to provide identifying information associated with the second dialog identifier;

processing the third data and the third audio data to determine fourth data responsive to the first utterance;
outputting a second response representing the fourth data, the second response including a request for information;
receiving fifth audio data representing a third utterance;
processing the fifth audio data and the third audio data to determine fifth data responsive to the third utterance; and
outputting a third response representing the fifth data.

6. The computer-implemented method of claim 3, further comprising:
receiving, at the first system and from the first device, third audio data representing a third utterance detected by the first device;
receiving, at the first system, a second dialog identifier that identifies at least one second communication between the first device and the second system, the at least one second communication corresponding to fourth audio data representing a fourth utterance detected by the first device prior to detecting the third utterance;
determining that the third audio data is associated with a third entity;
sending, from the first system to the second system, a second request for information about the third entity, the second request including the second dialog identifier;
receiving, by the first system from the second system, third data responsive to the second request, the third data indicating that the second system declines to provide identifying information associated with the second dialog identifier;
processing the third data and the third audio data to determine fourth data responsive to the first utterance; and
outputting a second response representing the fourth data, the second response including an indication that a different system can respond to the third utterance.

7. The computer-implemented method of claim 3, further comprising:
determining, by the first system, that the first data corresponds to a first entity ontology;
determining a correspondence between the first entity ontology and a second entity ontology; and
determining, based on the correspondence between the first entity ontology and the second entity ontology, that the first data corresponds to the first entity.

8. The computer-implemented method of claim 3, further comprising:
processing the first audio data to detect a first wakeword in the first audio data, wherein the first wakeword is associated with the first system and different from a second wakeword associated with the second system.

9. The computer-implemented method of claim 3, further comprising:
receiving, at the first system and from the first device, third audio data representing a third utterance detected by the first device;
receiving, at the first system, a second dialog identifier that identifies at least one second communication between the first device and the second system, the at least one second communication corresponding to fourth audio data representing a fourth utterance detected by the first device prior to detecting the third utterance;
determining that the third audio data references a third entity;
sending, from the first system to the second system, a second request for information about the third entity, the second request including the second dialog identifier;
receiving, from the second system responsive to the second request, third data including at least one of contact data from a contact list stored in the second system, or event data from a calendar application of the second system;
processing the third data and the third audio data to determine fourth data responsive to the first utterance; and
outputting, based on the fourth data, a second response.

10. The computer-implemented method of claim 3, further comprising:
receiving, at the first system and from the first device, third audio data representing a third utterance detected by the first device;
receiving, at the first system, a second dialog identifier that identifies at least one second communication between the first device and the second system, the at least one second communication corresponding to fourth audio data representing a fourth utterance detected by the first device prior to detecting the third utterance;
determining that the third audio data references a third entity not resolvable by the second system based on the third audio data;
sending, from the first system to the second system, a second request for information about the third entity, the second request including the second dialog identifier;
receiving, from the second system, an indication that the second system could not identify data responsive to the second request; and
outputting, based on the indication, a second response indicating that the third utterance could not be resolved.

11. A first system, comprising:
at least one processor; and
at least one memory comprising instructions that, when executed by the at least one processor, cause the first system to:
receive, from a first device via a network, first audio data representing a first utterance detected by the first device;
receive, from the first device via the network, a first dialog identifier that identifies at least one prior communication between the first device and a second system different from the first system, the at least one prior communication corresponding to second audio data representing a second utterance detected by the first device prior to detecting the first utterance;
determine that the first audio data is associated with a first entity;
send, to the second system via the network, a first request for information about the first entity, the first request including the first dialog identifier;
receive, from the second system via the network, first data responsive to the first request, the first data including a representation of a second entity corresponding to the second audio data;
process the first data and the first audio data to determine second data responsive to the first utterance; and
output a first response representing the second data.

12. The first system of claim 11, wherein the at least one memory further comprises instructions that, when executed by the at least one processor, further cause the first system to:
   fail to resolve, by the first system, the first entity based on the first audio data, and
   send the first request subject to failing to resolve, by the first system, the first entity based on the first audio data.

13. The first system of claim 11, wherein the at least one memory further comprises instructions that, when executed by the at least one processor, further cause the first system to:
   receive, from the first device, third audio data representing a third utterance detected by the first device;
   receive a second dialog identifier that identifies at least one second communication between the first device and the second system, the at least one second communication corresponding to fourth audio data representing a fourth utterance detected by the first device prior to detecting the third utterance;
   determine that the third audio data is associated with a third entity;
   send, to the second system, a second request for information about the third entity, the second request including the second dialog identifier;
   receive, from the second system, third data responsive to the second request, the third data indicating that the second system declines to provide identifying information associated with the second dialog identifier;
   process the third data and the third audio data to determine fourth data responsive to the first utterance;
   output a second response representing the fourth data, the second response including a request for information;
   receive fifth audio data representing a third utterance;
   process the fifth audio data and the third audio data to determine fifth data responsive to the third utterance; and
   output a third response representing the fifth data.

14. The first system of claim 11, wherein the at least one memory further comprises instructions that, when executed by the at least one processor, further cause the first system to:
   receive, from the first device, third audio data representing a third utterance detected by the first device;
   receive a second dialog identifier that identifies at least one second communication between the first device and the second system, the at least one second communication corresponding to fourth audio data representing a fourth utterance detected by the first device prior to detecting the third utterance;
   determine that the third audio data is associated with a third entity;
   send, to the second system, a second request for information about the third entity, the second request including the second dialog identifier;
   receive, from the second system, third data responsive to the second request, the third data indicating that the second system declines to provide identifying information associated with the second dialog identifier;
   process the third data and the third audio data to determine fourth data responsive to the first utterance; and
   output a second response representing the fourth data, the second response including an indication that a different system can respond to the third utterance.

15. The first system of claim 11, wherein the at least one memory further comprises instructions that, when executed by the at least one processor, further cause the first system to:
   determine that the first data corresponds to a first entity ontology;
   determine a correspondence between the first entity ontology and a second entity ontology; and
   determine, based on the correspondence between the first entity ontology and the second entity ontology, that the first data corresponds to the first entity.

16. The first system of claim 11, wherein the at least one memory further comprises instructions that, when executed by the at least one processor, further cause the first system to:
   process the first audio data to detect a first wakeword in the first audio data, wherein the first wakeword is associated with the first system and different from a second wakeword associated with the second system.

17. The first system of claim 11, wherein the at least one memory further comprises instructions that, when executed by the at least one processor, further cause the first system to:
   receive, from the first device, third audio data representing a third utterance detected by the first device;
   receive a second dialog identifier that identifies at least one second communication between the first device and the second system, the at least one second communication corresponding to fourth audio data representing a fourth utterance detected by the first device prior to detecting the third utterance;
   determine that the third audio data references a third entity;
   send, to the second system, a second request for information about the third entity, the second request including the second dialog identifier;
   receive, from the second system responsive to the second request, third data including at least one of contact data from a contact list stored in the second system, or event data from a calendar application of the second system;
   process the third data and the third audio data to determine fourth data responsive to the first utterance; and
   output, based on the fourth data, a second response.

18. The first system of claim 11, wherein the at least one memory further comprises instructions that, when executed by the at least one processor, further cause the first system to:
   receive, from the first device, third audio data representing a third utterance detected by the first device;
   receive a second dialog identifier that identifies at least one second communication between the first device and the second system, the at least one second communication corresponding to fourth audio data representing a fourth utterance detected by the first device prior to detecting the third utterance;
   determine that the third audio data references a third entity not resolvable by the second system based on the third audio data;
   send, to the second system, a second request for information about the third entity, the second request including the second dialog identifier;
   receive, from the second system, an indication that the second system could not identify data responsive to the second request; and
   output, based on the indication, a second response indicating that the third utterance could not be resolved.

* * * * *